United States Patent
Wu et al.

(10) Patent No.: US 10,489,485 B2
(45) Date of Patent: *Nov. 26, 2019

(54) ANALYTIC SYSTEM FOR STREAMING QUANTILE COMPUTATION

(71) Applicant: SAS Institute Inc., Cary, NC (US)

(72) Inventors: Xinmin Wu, Cary, NC (US); Tao Wang, Cary, NC (US); Scott Russell Pope, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,690

(22) Filed: Apr. 30, 2019

(65) Prior Publication Data

US 2019/0258697 A1    Aug. 22, 2019

Related U.S. Application Data

(63) Continuation-in-part of application No. 16/140,931, filed on Sep. 25, 2018, now Pat. No. 10,311,128, which is a continuation-in-part of application No. 15/961,373, filed on Apr. 24, 2018, now Pat. No. 10,127,192.

(60) Provisional application No. 62/814,937, filed on Mar. 7, 2019, provisional application No. 62/563,142, filed on Sep. 26, 2017.

(51) Int. Cl.
*G06F 17/18* (2006.01)

(52) U.S. Cl.
CPC ................................ *G06F 17/18* (2013.01)

(58) Field of Classification Search
CPC ....................................................... G06F 17/18

USPC ............................................................ 708/207
See application file for complete search history.

(56) References Cited

U.S. PATENT DOCUMENTS

| 10,127,192 | B1 | 11/2018 | Hu et al. |
| 2013/0325825 | A1 | 12/2013 | Pope et al. |
| 2018/0181541 | A1 | 6/2018 | Yao |

OTHER PUBLICATIONS

Wang, Tao, "A Unified Analytical Framework for Trustable Machine Learning and Automation Running with Blockchain," IEEE Big Data Workshops, 2018, pp. 4974-4983.
Herlihy, Maurice, "Blockchains from a Distributed Computing Perspective," Communications of the ACM, Feb. 2019, vol. 62, No. 2, pp. 78-85.

(Continued)

*Primary Examiner* — Tan V Mai
(74) *Attorney, Agent, or Firm* — Bell & Manning, LLC

(57) ABSTRACT

A computing device computes a quantile value for a variable value extracted from an event block object by computing a bin number for the variable value. If the computed bin number is between a before bin number and an after bin number computed for a quantile, the quantile is identified. Frequency data is updated to include the extracted variable value as a key value. A frequency value associated with the key value indicates a number of occurrences of the variable value in previously processed data. A cumulative rank value of the identified quantile is updated. A quantile adjustment value is computed based on a comparison between the variable value and a current quantile value of the identified quantile. An updated quantile value associated with the identified quantile is computed using the updated frequency data, the computed quantile adjustment value, and the updated cumulative rank value of the identified quantile.

30 Claims, 23 Drawing Sheets

(56) References Cited

OTHER PUBLICATIONS

An Introduction to SAS Viya 3.2 Programming, SAS Institute, Oct. 2017.
Kafka, https://kafka.apache.org/, retrieved in Feb. 2019, 6 pages.
A New Perspective on Opioids and Blockchain, Hashed Health, Feb. 6, 2018.
Sam Penfield, A Practical Approach to Blockchain Analytics, https://blogs.sas.com/content/sascom/2017/12/15/practical-approach-biockchain-analytics/.
Karp et al., A Simple Algorithm for Finding Frequent Elements in Streams and Bags, ACM Transactions on Database Systems, vol. 28, No. 1, Mar. 2003, pp. 51-55.
Agrawal et al., "Mining Association Rules between Sets of Items in Large Databases," Proceedings of the 1993 ACM SIGMOND Conference, May 1993, pp. 1-10.
Leo Sadovy, AI and trust, SAS Blog, https://blogs.sas.com/content/sascom/2018/05/21/ai-and-trust/ 6 pages.
Wikipedia, Amazon Web Services, https://en.wikpedia.org/wiki/Arnazon_Web_Services, printed Mar. 8, 2019.
Wexler, An Overview of SAS Visual Data Mining and Machine Learning on SAS Viya, SAS Institute, 2017.
Hazelwood, "Applied Machine Learning at Facebook: A Datacenter Infrastructure Perspective," 2018 IEEE International Symposium on High Performance Computer Architecture, pp. 620-629, 2018.
Manku et al., "Approximate Frequency Counts over Data Streams," Proceedings of the $28^{th}$ VLDB Conference, Hong Kong, China 2002, 12 pages.
Meet BigchainDB, The Blockchain database, https://www.bigchaindb.com; printed Mar. 8, 2019.
Nakamota, Satoshi, "Bitcoin: A Peer-to-Peer Electronic Cash System" published 2018, bitcoin.org.
Day et al, Bitcoin in BigQuery: blockchain analytics on public data, Bitcoin in BigQuery: blockchain analytics on public data | Google Cloud Feb. 8, 2018, 6 page.
Aaron Hankin, Bitcoin Pizza Day: Celebrating the $80 Million Pizza Order, Investopedia, May 22, 2018.
Wikipedia, Blockchain, 18 pages, printed Mar. 8, 2019 from the internet.
Wright, Ben, Brother, can you spare a Healthcoin?—SAS Voices, 6 pages, Nov. 16, 2017.
What is a Bitcoin Whale?, https://www.ccn.com/bitcoin-whale, printed Mar. 8, 2019, 5 pages.
Digitize with Sequence, https://chain.com, printed Mar. 8, 2019, 2 pages.
Chang et al., "Finding Recent Frequent Itemsets Adaptively over Online Data Streams," SIGKDD '03, Aug. 24, 2003, ACM, pp. 487-492.
Osipkov et al., "Combating Double-Spending Using Cooperative P2P Systems," 27th International Conference on Distributed Computing Systems (ICDCS '07), 2007, 11 pages.
Wikipedia—ConsenSys, 4 pages printed Mar. 8, 2019.
Pivarski et al., "Deploying Analytics with the Portable Format for Analytics (PFA)," KDD-16, ACM, Aug. 13-17, 2016, 10 pages.
Metwally et al., "Efficient Computation of Frequent and Top-k Elements in Data Streams," ICDT 2005, LNCS 3363, pp. 398-412, 2005.
Buterin, Vitalik, Ethereum White Paper, A next Generation Smart Contract Decentralize Application Platform, Feb. 27, 2018.
Yu et al., "False Positive or False Negative: Mining Frequent Itemsets from High Speed Transactional Data Streams," Proceedings of the $30^{th}$ VLDB Conference, 2004, pp. 204-215.
Hoepman, Jaap-Henk, "Distributed Double Spending Prevention," 15th Int. Workshop on Security Protocols, 2007, pp. 152-165.
Windley, Phillip, "How blockchain makes self-sovereign identities possible" Computerworld, Jan. 10, 2018.
Cryptocurrency Market Capitalizations, CoinMarketCap, printed Mar. 8, 2019, 7 pages.
GDPR Key Changes, https://eugidpr.org/the-regulation, printed Mar. 8, 2019.
Hyperledger—Open Source Blockchain Technologies, https://www.hyperledger.orq/ printed Mar. 8, 2019, 3 pages.
Bajpai, Prableen, "Kodak, The Blockchain and Cryptocurrency: How Kodak is Tapping Into Technology," https://www.nadag.com/aspx/stockmarketnewstoryprint.aspx?storyidi=kodak-theblockha . . . , printed Mar. 8, 2019.
Johnson, Steven, Beyond the Bitcoin Bubble. The New York Times, Jan. 16, 2018, 12 pages.
Omnicell—Discover a Bold New Vision for Rx Care Delivery, www.omnicell.com/us/en_us, printed Mar. 8, 2019.
Saygin et al., "Privacy Preserving Association Rule Mining" Proceedings of the $12^{th}$ Int'l Wrkshp on Research Issues in Data Engineering: Engineering e-Commerce/e-Business Systems, 2002, 8 pages.
Evfimievski et al., "Privacy Preserving Mining of Association Rules," SIGKDD 02, 2002, 12 pages.
Wikipedia—Raft (Computer Science), printed Mar. 8, 2019.
Rizvi Shariq, "Maintaining Data Privacy in Association Rule Mining" MASK Presentation (VLDB), Aug. 2002.
Lamport et al, "The Byzantine Generals Problem," ACM Transactions on Programming Languages and Systems, vol. 4, No. 3, Jul. 1982, pp. 382-401.
Hodges, Andrew, Alan Turing: The Enigma, Chapter 3, New Men, Copyright 1983, Simon and Schuster.
Grossman et al., "The management and mining of multiple predictive models using the predictive modeling markup language," Information and Software Technology, vol. 41, pp. 589-595, 1999.
The Hyperledger Vision, Blockchain 101, Introducing Hyperledger, Industry use Cases, accessed Mar. 8, 2019, 42 pages.
Plinke, Helmut, "Will GDPR disrupt analytics?," SAS Blog, May 24, 2018.
Introducing Corda, www.r3.com/, printed Mar. 8, 2019, 8 pages.

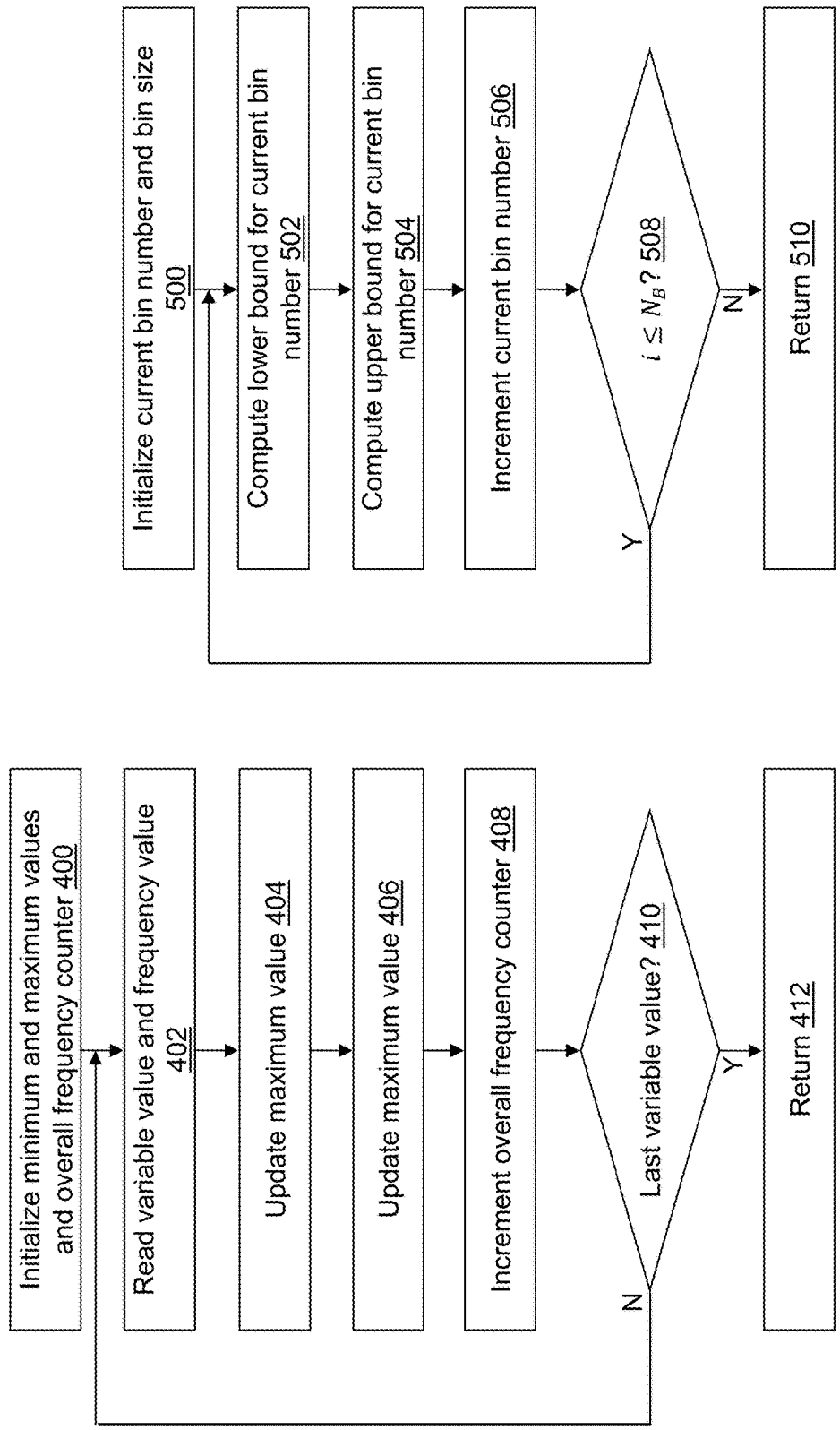

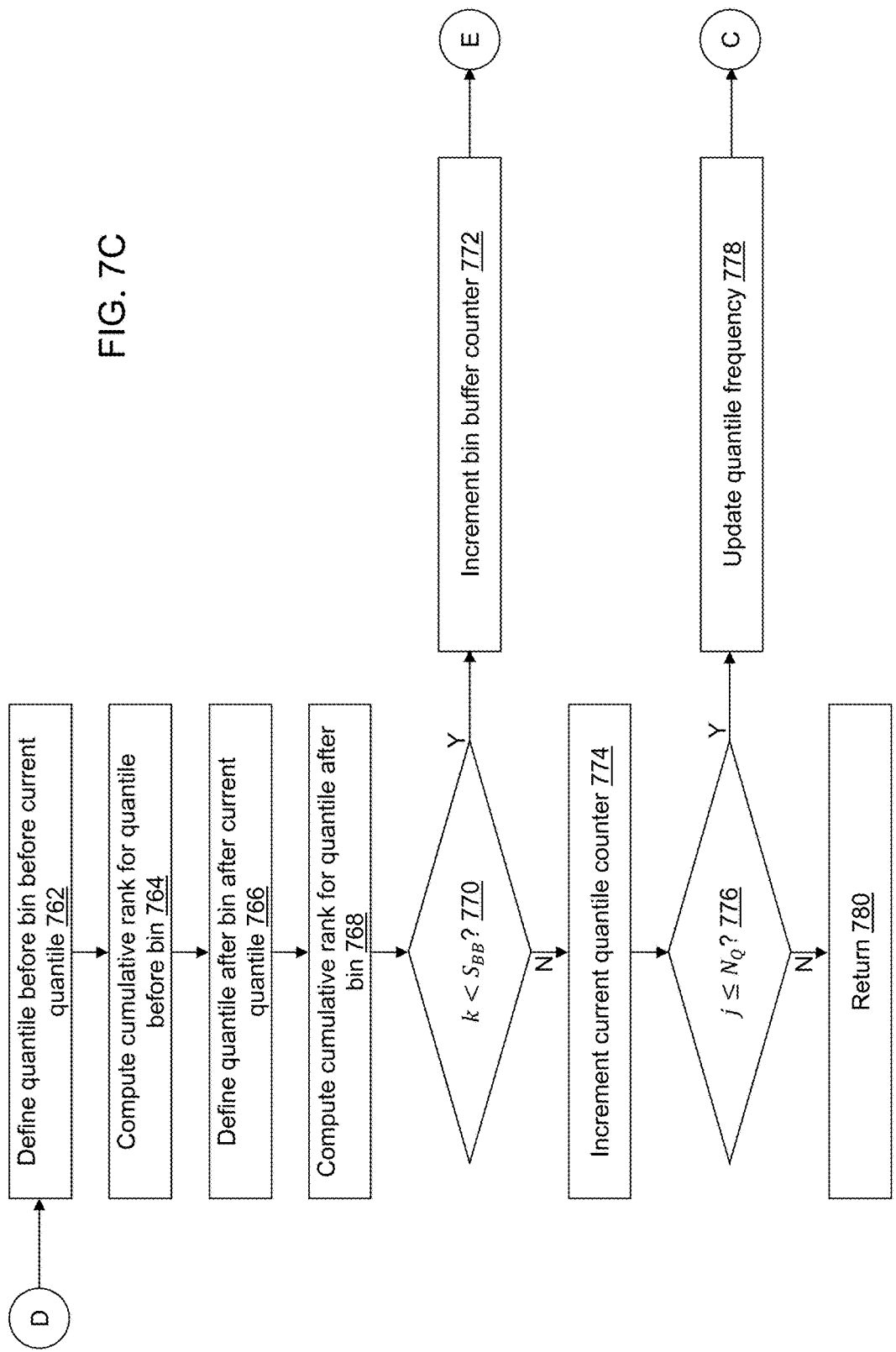

US 10,489,485 B2

ANALYTIC SYSTEM FOR STREAMING QUANTILE COMPUTATION

CROSS-REFERENCE TO RELATED APPLICATIONS

The present application claims the benefit of 35 U.S.C. § 119(e) to U.S. Provisional Patent Application No. 62/814,937 filed on Mar. 7, 2019, the entire contents of which is hereby incorporated by reference. The present application is also a continuation-in-part of U.S. patent application Ser. No. 16/140,931 that was filed Sep. 25, 2018, the entire contents of which is hereby incorporated by reference. U.S. patent application Ser. No. 16/140,931 claimed the benefit of 35 U.S.C. § 119(e) to U.S. Provisional Patent Application No. 62/563,142 filed on Sep. 26, 2017, the entire contents of which is hereby incorporated by reference. U.S. patent application Ser. No. 16/140,931 is also a continuation-in-part of U.S. patent application Ser. No. 15/961,373 filed on Apr. 24, 2018 and issued Nov. 13, 2018 as U.S. Pat. No. 10,127,192, the entire contents of which is hereby incorporated by reference. U.S. patent application Ser. No. 15/961,373 also claimed the benefit of 35 U.S.C. § 119(e) to U.S. Provisional Patent Application No. 62/563,142 filed on Sep. 26, 2017, the entire contents of which is hereby incorporated by reference.

BACKGROUND

Quantiles (or percentiles) are essential statistical descriptions for data. They provide a numerical and an accurate view of data and the shape of a data distribution. However, computing exact quantiles for distributed data systems and/or big data environments remains challenging because data stored in different computing nodes and the amount of data prevents sorting, which is commonly used to compute the quantiles.

SUMMARY

In an example embodiment, a non-transitory computer-readable medium is provided having stored thereon computer-readable instructions that, when executed by a computing device, cause the computing device to compute a quantile value. (a) An event block object is received in an event stream from a second computing device. The event stream includes a plurality of event block objects. (b) A variable value of a variable is extracted from the received event block object. (c) A bin number is computed for the extracted variable value. The bin number indicates a bin of a plurality of bins within which the extracted variable value is located based on an upper bin value and a lower bin value computed for each bin of the plurality of bins. (d) If the computed bin number is between a before bin number computed for a quantile and an after bin number computed for the quantile is determined. (e) The quantile is identified for the extracted variable value when the computed bin number is between the before bin number computed for the quantile and the after bin number computed for the quantile. (f) Frequency data is updated to include the extracted variable value as a key value. A frequency value is associated with the key value. The frequency value indicates a number of occurrences of the extracted variable value in previously processed data. (g) A cumulative rank value of the identified quantile is updated. (h) A quantile adjustment value is computed based on a comparison between the extracted variable value and a current quantile value of the identified quantile. (i) An updated quantile value associated with the identified quantile is computed using the updated frequency data, the computed quantile adjustment value, and the updated cumulative rank value of the identified quantile. (j) the computed, updated quantile value is output.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to compute a quantile value.

In yet another example embodiment, a method of computing a quantile value is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, 3 to 6, 7A to 7C, 8, and 9 depict flow diagrams illustrating examples of operations performed by the quantile computation device of FIG. 1 in accordance with an illustrative embodiment.

DETAILED DESCRIPTION

Figure 1:
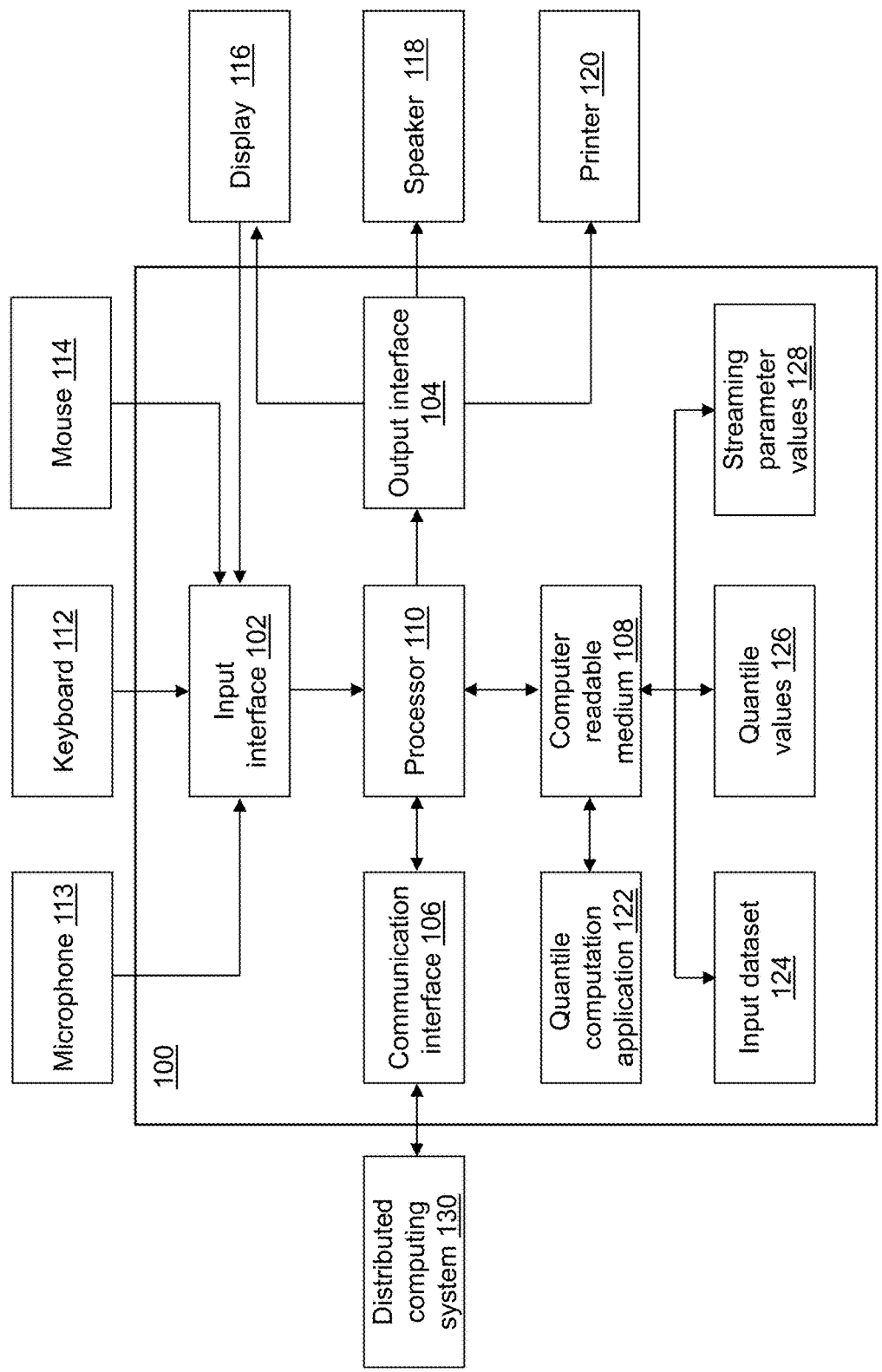
FIG. 1 depicts a block diagram of a quantile computation device in accordance with an illustrative embodiment.

Referring to FIG. 1, a block diagram of a quantile computation device 100 is shown in accordance with an illustrative embodiment. Quantile computation device 100 may compute a quantile value for each quantile of one or more quantile values. Quantile computation device 100 may include an input interface 102, an output interface 104, a communication interface 106, a non-transitory computer-readable medium 108, a processor 110, a quantile computation application 122, an input dataset 124, quantile values 126, and streaming parameter values 128. Fewer, different, and/or additional components may be incorporated into quantile computation device 100.

Quantile computation application 122 provides an efficient and exact method to locate quantiles in at most three passes through input dataset 124 that may be distributed or classified as "big data" due to the large number of values of the variable. Quantile computation application 122 avoids non-convergence situations that may occur using the iterative algorithm (the percentile action) and does not need expensive sorting that may occur using the sorting-based algorithm (the aggregate action). Therefore, quantile computation application 122 is an improvement to existing processes performed by computing devices in solving the technical problem of computing quantiles from a dataset. Quantile computation application 122 does not require a stopping criterion such as a number of iterations or a convergence tolerance for which values may be difficult to define. Quantile computation application 122 also computes an exact quantile for any distributed or big data with comparable or significantly less computational cost compared with existing methods. Quantile computation application 122 can also compute streaming parameter values 128 that can be used by an event stream processing (ESP) device 1004 (shown referring to FIG. 10) to compute a quantile value for streaming data.

Input interface 102 provides an interface for receiving information from the user or another device for entry into quantile computation device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into quantile computation device 100 or to make selections presented in a user interface displayed on display 116.

The same interface may support both input interface 102 and output interface 104. For example, display 116 comprising a touch screen provides a mechanism for user input and for presentation of output to the user. Quantile computation device 100 may have one or more input interfaces that use the same or a different input interface technology. The input interface technology further may be accessible by quantile computation device 100 through communication interface 106.

Output interface 104 provides an interface for outputting information for review by a user of quantile computation device 100 and/or for use by another application or device. For example, output interface 104 may interface with various output technologies including, but not limited to, display 116, a speaker 118, a printer 120, etc. Quantile computation device 100 may have one or more output interfaces that use the same or a different output interface technology. The output interface technology further may be accessible by quantile computation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Quantile computation device 100 may have one or more communication interfaces that use the same or a different communication interface technology. For example, quantile computation device 100 may support communication using an Ethernet port, a Bluetooth antenna, a telephone jack, a USB port, etc. Data and messages may be transferred between quantile computation device 100 and another computing device of distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Quantile computation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Quantile computation device 100 also may have one or more drives that support the loading of a memory media such as a CD, DVD, an external hard drive, etc. One or more external hard drives further may be connected to quantile computation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Quantile computation device 100 may include a plurality of processors that use the same or a different processing technology.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional energy efficiencies, processing speed improvements, data communication speed improvements, and/or data efficiency response variables and improvements throughout various parts of the system.

Quantile computation application 122 performs operations associated with defining frequency data and quantile values 126 and, optionally, streaming parameter values 128 from data stored in input dataset 124. Quantile values 126 define a variable value of input dataset 124 that is associated with each quantile of one or more quantiles computed by ranking the variable values of input dataset 124. Some or all of the operations described herein may be embodied in quantile computation application 122. The operations may be implemented using hardware, firmware, software, or any combination of these methods.

Referring to the example embodiment of FIG. 1, quantile computation application 122 is implemented in software (comprised of computer-readable and/or computer-executable instructions) stored in computer-readable medium 108 and accessible by processor 110 for execution of the instructions that embody the operations of quantile computation application 122. Quantile computation application 122 may be written using one or more programming languages, assembly languages, scripting languages, etc. Quantile computation application 122 may be integrated with other analytic tools. As an example, quantile computation application 122 may be part of an integrated data analytics software application and/or software architecture such as that offered by SAS Institute Inc. of Cary, N.C., USA. Merely for illustration, quantile computation application 122 may be implemented using or integrated with one or more SAS software tools such as such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Quantile computation application 122 may be implemented as a Web application. For example, quantile computation application 122 may be configured to receive hypertext transport protocol (HTTP) responses and to send HTTP requests. The HTTP responses may include web pages such as hypertext markup language documents and linked objects generated in response to the HTTP requests. Each web page may be identified by a uniform resource locator that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. An observation vector is defined as $x_j$ that may include a value for each of the plurality of variables associated with the observation j. Each variable of the plurality of variables may describe a characteristic of a physical object. For example, if input dataset 124 includes data related to operation of a vehicle, the variables may include an oil pressure, a speed, a gear indicator, a gas tank level, a tire pressure for each tire, an engine temperature, a radiator level, etc. Input dataset 124 may include data captured as a function of time for one or more physical objects.

The data stored in input dataset 124 may be generated by and/or captured from a variety of sources including one or more sensors of the same or different type, one or more computing devices, etc. The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing.

Input dataset 124 may be stored on computer-readable medium 108 and/or on one or more computer-readable media of distributed computing system 130 and accessed by quantile computation device 100 using communication interface 106, input interface 102, and/or output interface 104. Data stored in input dataset 124 may be sensor measurements or signal values captured by a sensor, may be generated or captured in response to occurrence of an event or a transaction, generated by a device such as in response to an interaction by a user with the device, etc. The data stored in input dataset 124 may be captured at different time points periodically, intermittently, when an event occurs, etc. One or more columns of input dataset 124 may include a time and/or date value.

Input dataset 124 may include data captured under normal operating conditions of the physical object. Input dataset 124 may include data captured at a high data rate such as 200 or more observation vectors per second for one or more physical objects. For example, data stored in input dataset 124 may be generated as part of the Internet of Things (IoT), where things (e.g., machines, devices, phones, sensors, smart meters for energy, personal wearable devices, health monitoring devices, autonomous vehicle devices, robotic components, identification devices, etc.) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

Input dataset 124 may be stored using various data structures as known to those skilled in the art including one or more files of a file system, a relational database, one or more tables of a system of tables, a structured query language database, etc. on quantile computation device 100 and/or on distributed computing system 130. Quantile computation device 100 may coordinate access to input dataset 124 that is distributed across distributed computing system 130 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS® Viya™ open, cloud-ready, in-memory architecture also may be used as an analytic platform to enable multiple users to concurrently access data stored in input dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Referring to FIGS. 2A, 2B, 3 to 6, 7A, 7B, 8, and 9, example operations associated with quantile computation application 122 are described. Quantile computation application 122 may be used to create quantile values 126 and/or streaming parameter values 128 from input dataset 124. Quantile computation application 122 may be executed directly by the user or may be called by another application with a request to compute one or more quantile values. Additional, fewer, or different operations may be performed depending on the embodiment of quantile computation application 122. The order of presentation of the operations of FIGS. 2A, 2B, 3 to 6, 7A, 7B, 8, and 9 is not intended to be limiting. Some of the operations may not be performed in some embodiments. Although some of the operational flows are presented in sequence, the various operations may be performed in various repetitions, concurrently (in parallel, for example, using threads and/or distributed computing system 130), and/or in other orders than those that are illustrated. For example, a user may execute quantile computation application 122, which causes presentation of a first user interface window, which may include a plurality of menus and selectors such as drop-down menus, buttons, text boxes, hyperlinks, etc. associated with quantile computation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by quantile computation application 122.

Figure 2A:
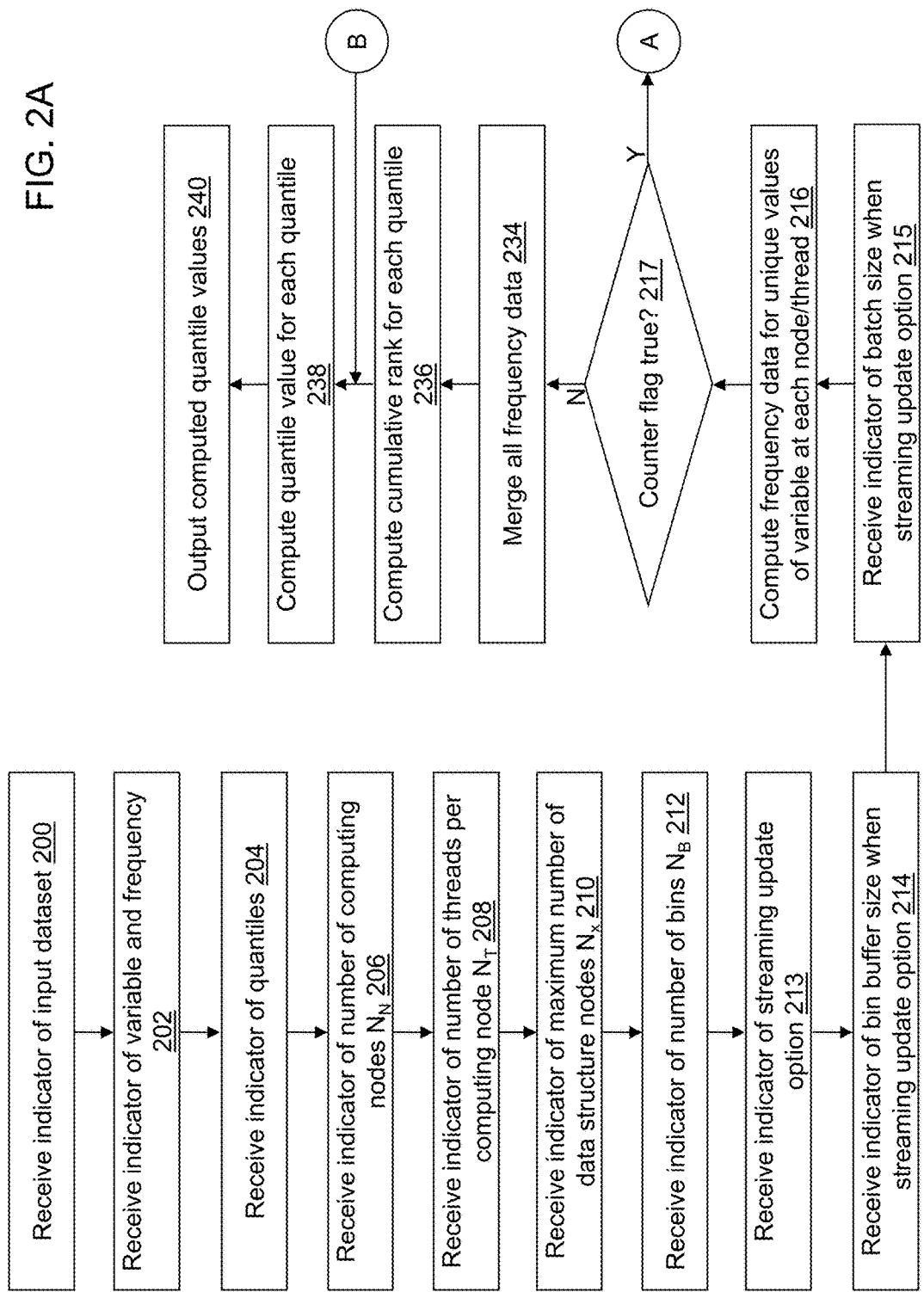

Referring to FIG. 2A, in an operation 200, a first indicator may be received that indicates input dataset 124. For example, the first indicator indicates a location and a name of input dataset 124. As an example, the first indicator may be received by quantile computation application 122 after selection from a user interface window, after entry by a user into a user interface window, by extracting the information from a request, by reading an input file, etc. In an alternative embodiment, input dataset 124 may not be selectable. For example, a most recently created dataset may be used automatically.

In an operation 202, a second indicator may be received that indicates variable x and a frequency value for variable x in input dataset 124. For example, the second indicator may indicate a column number or a column name for each of variable x and the frequency value. As another option, a first pair or a last pair of columns of input dataset 124 may be assumed to be variable x and the frequency value. As an example, the second indicator may be received by quantile computation application 122 after selection from a user interface window, after entry by a user into a user interface window, by extracting the information from a request, by reading an input file, etc.

In an operation 204, a third indicator may be received that indicates a quantile for which to compute a value of the variable x associated with the quantile. The quantile is a value between zero and one exclusive. Alternatively, the quantile may be a percentile that is converted to a decimal value after receipt. A plurality of quantiles may be received. $N_Q$ is a number of the quantiles that may be one. Q references a set of the one or more quantiles indicated by the third indicator. For example, the plurality of quantiles may be a list of percentiles to compute provided by the user such as 0.15, 0.3, 0.35, 0.45, 0.5, 0.55, 0.75, where $N_Q=7$, and Q={0.15, 0.3, 0.35, 0.45, 0.5, 0.55, 0.75}. In an alternative embodiment, the third indicator may not be received. For example, a default value(s) may be stored, for example, in computer-readable medium 108 and used automatically. In another alternative embodiment, the quantile(s) may not be selectable. Instead, a fixed, predefined value may be used. For illustration, a default value for the set of quantiles may be Q={0.1, 0.2, 0.3, 0.4, 0.5, 0.6, 0.7, 0.8, 0.9}, where $N_Q=9$. One or more quantiles may be indicated using a variety of different methods. As an example, the third indicator may be received by quantile computation application 122 after selection from a user interface window, after entry by a user into a user interface window, by extracting the information from a request, by reading an input file, etc. If the one or more quantiles are not indicated in numerical order, the set of quantiles Q may be defined in numerical order based on the indicated numerical vales of the one or more quantiles. Q may be an array storing $N_Q$ values though different types of data structures may be used in alternative embodiments.

In an operation 206, a fourth indicator of a number of computing nodes $N_N$ of distributed computing system 130 may be received. In an alternative embodiment, the fourth indicator may not be received. For example, a default value may be stored, for example, in computer-readable medium 108 and used automatically. In another alternative embodiment, the number of computing nodes may not be selectable. Instead, a fixed, predefined value may be used. For illustration, a default value of the number of computing nodes may be one to indicate that quantile computation device 100 performs the operations of FIGS. 2A, 2B, 3 to 6, 7A, 7B, 8, and 9 without any other computing devices. As an example, the fourth indicator may be received by quantile computation application 122 after selection from a user interface window, after entry by a user into a user interface window, by extracting the information from a request, by reading an input file, etc.

In an operation 208, a fifth indicator of a number of threads $N_T$ may be received. In an alternative embodiment, the fifth indicator may not be received. For example, a default value may be stored, for example, in computer-readable medium 108 and used automatically. In another alternative embodiment, the number of threads may not be selectable. Instead, a fixed, predefined value may be used or may be determined based on a number of processors of quantile computation device 100. For illustration, a default value of the number of threads may be four. The number of threads may be available at each computing device of the number of computing nodes $N_N$. For example, using Hadoop, input dataset 124 may be split across a plurality of computing devices and further split across a plurality of threads at each computing device. As an example, the fifth indicator may be received by quantile computation application 122 after selection from a user interface window, after entry by a user into a user interface window, by extracting the information from a request, by reading an input file, etc.

In an operation 210, a sixth indicator of a maximum number of data structure nodes $N_X$ may be received. In an alternative embodiment, the sixth indicator may not be received. For example, a default value may be stored, for example, in computer-readable medium 108 and used automatically. In another alternative embodiment, the maximum number of data structure nodes may not be selectable. Instead, a fixed, predefined value may be used or may be determined based on an available memory of quantile computation device 100. For illustration, a default value for the maximum number of data structure nodes may be any value less than the amount of useable memory. As an example, the sixth indicator may be received by quantile computation application 122 after selection from a user interface window, after entry by a user into a user interface window, by extracting the information from a request, by reading an input file, etc.

In an operation 212, a seventh indicator of a number of bins $N_B$ may be received. In an alternative embodiment, the seventh indicator may not be received. For example, a default value may be stored, for example, in computer-readable medium 108 and used automatically. In another alternative embodiment, the number of bins may not be selectable. Instead, a fixed, predefined value may be used or may be determined based on an available memory of quantile computation device 100. For illustration, a default value for the number of bins may be 10,000. As an example, the seventh indicator may be received by quantile computation application 122 after selection from a user interface window, after entry by a user into a user interface window, by extracting the information from a request, by reading an input file, etc. In an alternative embodiment, the same value may be used for both $N_X$ and $N_B$ so that only one value is indicated.

In an operation 213, an eighth indicator of a streaming update option may be received. The streaming update option indicates whether streaming parameter values 128 will be computed and stored for application on streaming data. In an alternative embodiment, the eighth indicator may not be received. For example, a default value may be stored, for example, in computer-readable medium 108 and used automatically. In another alternative embodiment, the streaming update option may not be selectable. Instead, a fixed, predefined value may be used such as true or false. For illustration, a default value for the streaming update option may be true to indicate that streaming parameter values 128 will be computed and stored. As an example, the eighth indicator may be received by quantile computation application 122 after selection from a user interface window, after entry by a user into a user interface window, by extracting the information from a request, by reading an input file, etc.

In an operation 214, a ninth indicator of a bin buffer size $S_{BB}$ may be received when the streaming update option indicates true. The bin buffer size indicates a number of bins adjacent to each quantile of the set of quantiles to maintain when applied to streaming data. In an alternative embodiment, the ninth indicator may not be received. For example, a default value may be stored, for example, in computer-readable medium 108 and used automatically. In another alternative embodiment, the bin buffer size may not be selectable. Instead, a fixed, predefined value may be used. For illustration, a default value for the bin buffer size may be one. As an example, the ninth indicator may be received by quantile computation application 122 after selection from a user interface window, after entry by a user into a user interface window, by extracting the information from a request, by reading an input file, etc.

In an operation 215, a tenth indicator of a batch size $N_{SB}$ may be received when the streaming update option indicates true. The batch size indicates a number of streamed data points to process as a group. In an alternative embodiment, the tenth indicator may not be received. For example, a default value may be stored, for example, in computer-readable medium 108 and used automatically. In another alternative embodiment, the batch size may not be selectable. Instead, a fixed, predefined value may be used. For illustration, a default value for the batch size may be 10,000 though a higher or a lower value, including a value of one, may be used, for example, based on a streaming data rate, a number of data values included in an event block object, etc. As an example, the tenth indicator may be received by quantile computation application 122 after selection from a user interface window, after entry by a user into a user interface window, by extracting the information from a request, by reading an input file, etc.

In an operation 216, frequency data $T_{xkn}$ for unique values of the variable x may be computed by each thread k of the number of threads $N_T$ of each computing device n of the number of computing nodes $N_N$ of distributed computing system 130. Frequency data $T_{xkn}$ may be computed in a variety of manners. Frequency data $T_{xkn}$ may be stored as an array, a linked list, an AVL tree, a red-black tree, etc. In an illustrative embodiment, frequency data is stored using an ascending AVL tree. An AVL tree is a self-balancing binary search tree where a height of two child sub-trees of any node of the AVL tree differs by at most one. If at any time they differ by more than one, rebalancing is done to restore this property. Frequency data $T_{xkn}$ stores each unique value of the variable x and a frequency value that indicates a number of occurrences of the associated unique value in ascending order relative to the unique value. For illustration, example operations for computing frequency data $T_{xkn}$ are shown referring to FIG. 3.

In an operation 300, a data structure $T_{xkn}$ for frequency data, a unique value counter $N_U$, and a counter flag are initialized. For example, for an array type data structure for frequency data, memory is allocated for the array and array values are initialized to zero; for an AVL tree type data structure for frequency data, an empty tree is initialized; etc. The unique value counter may be initialized to zero, and the counter flag may be initialized to zero or FALSE.

In an operation 302, a variable value v for variable x and a frequency value for the variable value are read from input dataset 124.

In an operation 304, a determination is made concerning whether the unique value counter is less than the maximum number of data structure nodes $N_X$. When the unique value counter is less than the maximum number of data structure nodes $N_X$, processing continues in an operation 308. When the unique value counter is not less than the maximum number of data structure nodes $N_X$, processing continues in an operation 306.

In operation 306, the counter flag is set to one or TRUE, and processing continues in an operation 320 to indicate that the number of unique values of the variable x exceeds the maximum number of data structure nodes $N_X$.

In operation 308, a determination is made concerning whether the variable value exists in data structure $T_{xkn}$. When the variable value exists in data structure $T_{xkn}$, processing continues in an operation 310. When the variable value does not exist in data structure $T_{xkn}$, processing continues in an operation 312. For example, the read variable value is compared to existing keys of data structure $T_{xkn}$ that is an AVL tree to identify a matching key if it exists.

In operation 310, a frequency value associated with the existing variable value is updated in data structure $T_{xkn}$ by adding the read frequency value to the frequency value associated with the existing variable value, and processing continues in an operation 318.

In operation 312, the unique value counter is incremented by one to indicate that the read variable value is a new variable value.

In an operation 314, a new entry is created and added to data structure $T_{xkn}$. For example, a new AVL tree node is added in ascending order to data structure $T_{xkn}$ using the read variable value as a key so that the variable values are maintained in sorted order in data structure $T_{xkn}$.

In an operation 316, a frequency value associated with the variable value key in data structure $T_{xkn}$ is initialized with the read frequency value.

In operation 318, a determination is made concerning whether the read variable value is a last variable value of input dataset 124. When the read variable value is a last variable value, processing continues in operation 320. When the read variable value is not a last variable value, processing continues in operation 302 to read and process the next variable value.

In operation 320, processing to compute frequency data $T_{xkn}$ for unique values of the variable x by the thread k and the computing node n is complete or is stopped, and control returns to the calling operation. When the number of threads $N_T$ or the number of computing nodes $N_N$ is greater than one, the computed frequency data $T_{xkn}$ is returned to a controlling process and/or a controlling computing device. For example, quantile computation device 100 may be executing the controlling process and act as the controlling computing device.

Referring again to FIG. 2A, in an operation 217, a determination is made concerning whether the counter flag indicates true such that the number of unique values of the variable x exceeds the maximum number of data structure nodes $N_X$. When the counter flag indicates true, processing continues in an operation 218. When the counter flag indicates false, processing continues in an operation 234.

Figure 2B:
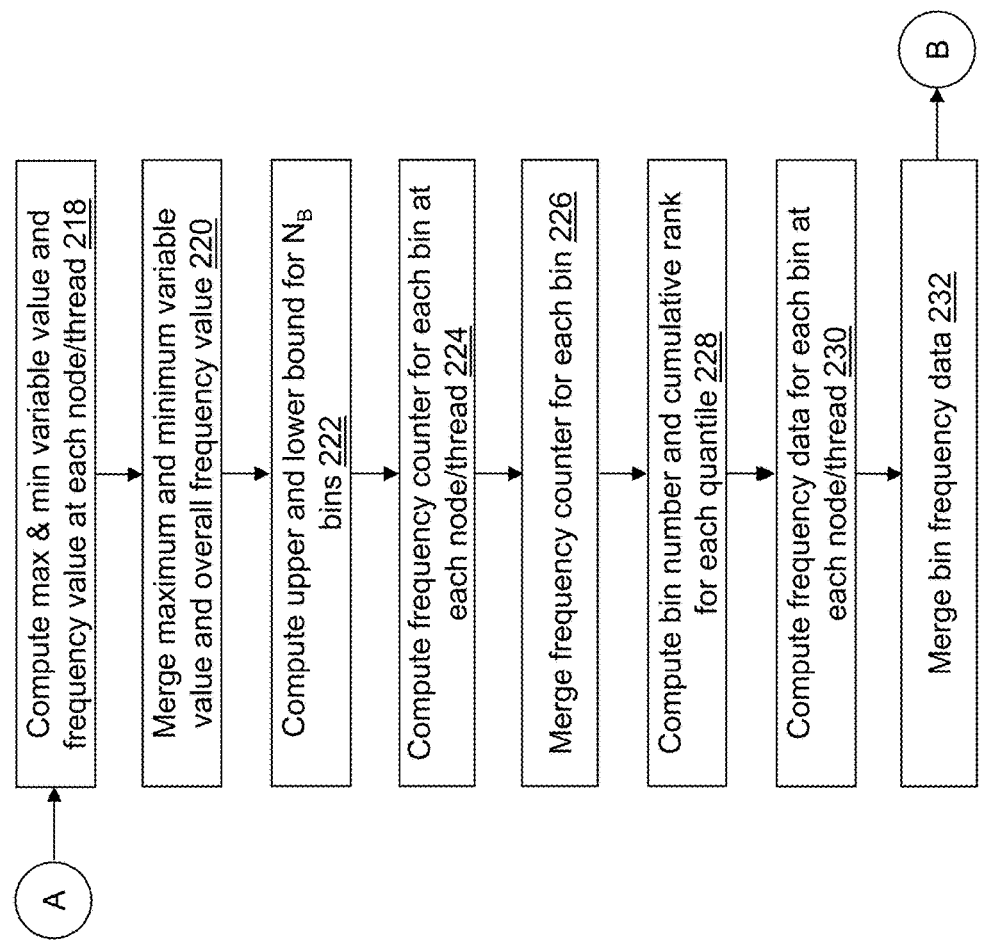
Figure 3:
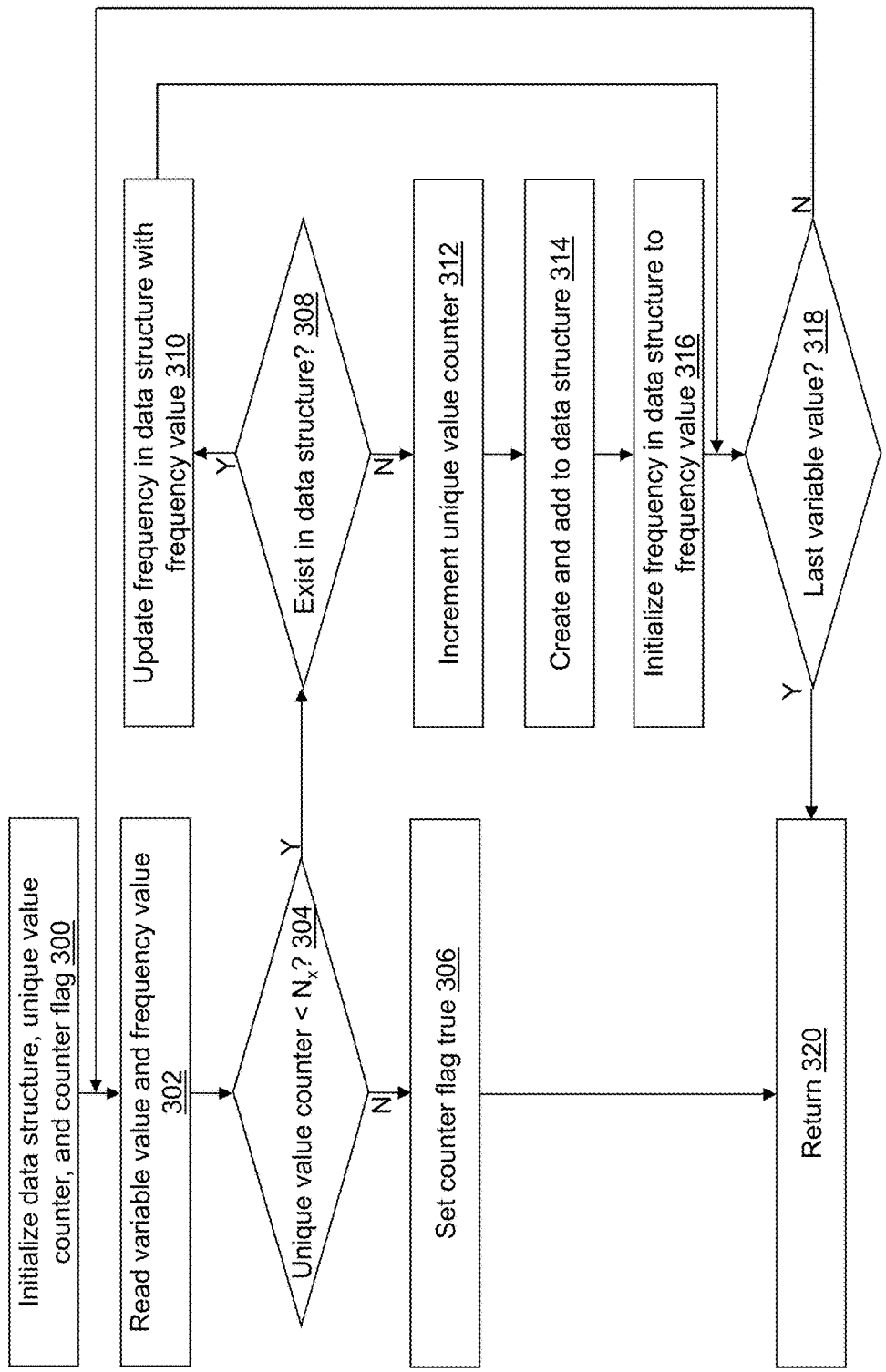
Figure 6:
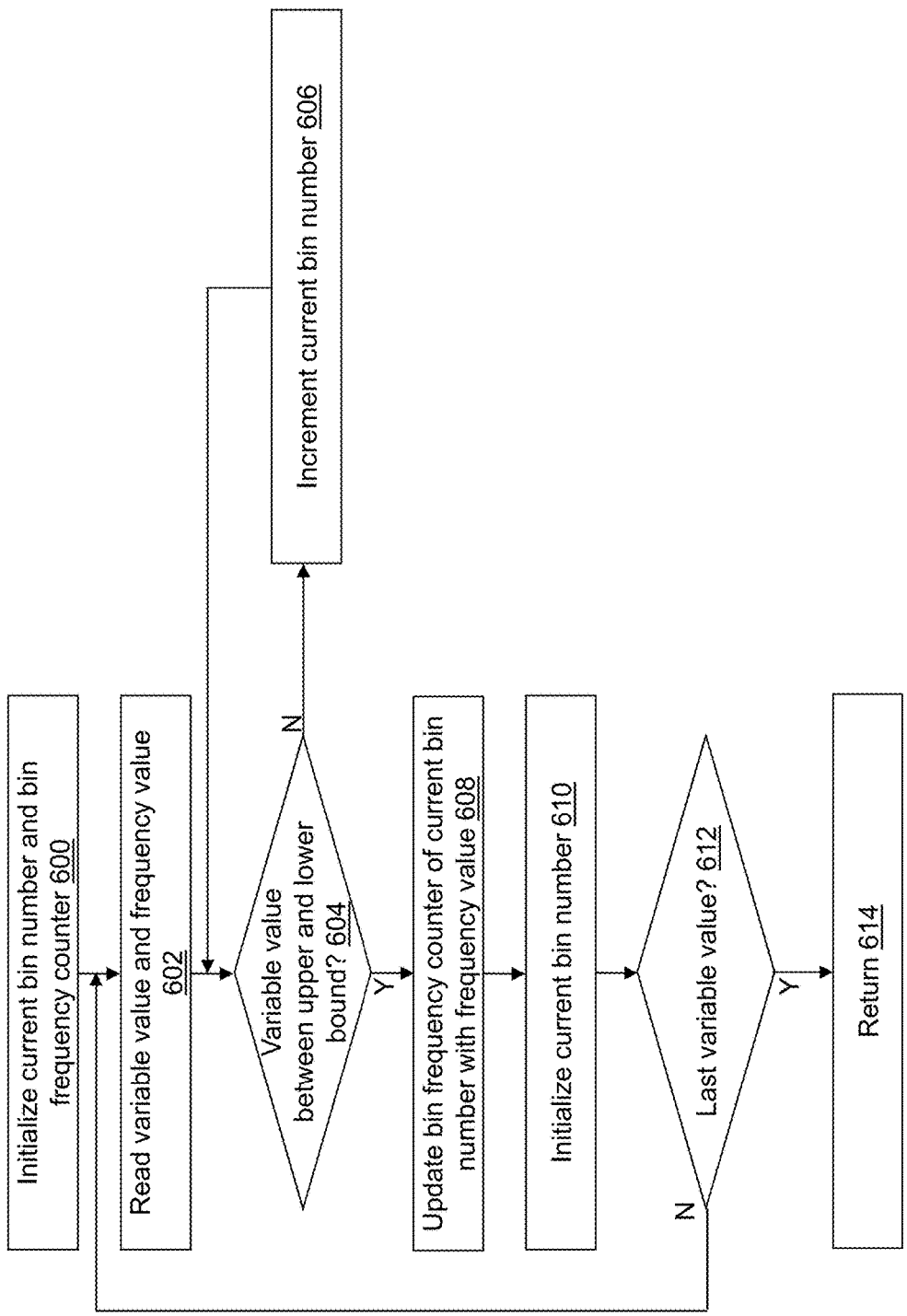
Figure 7A:
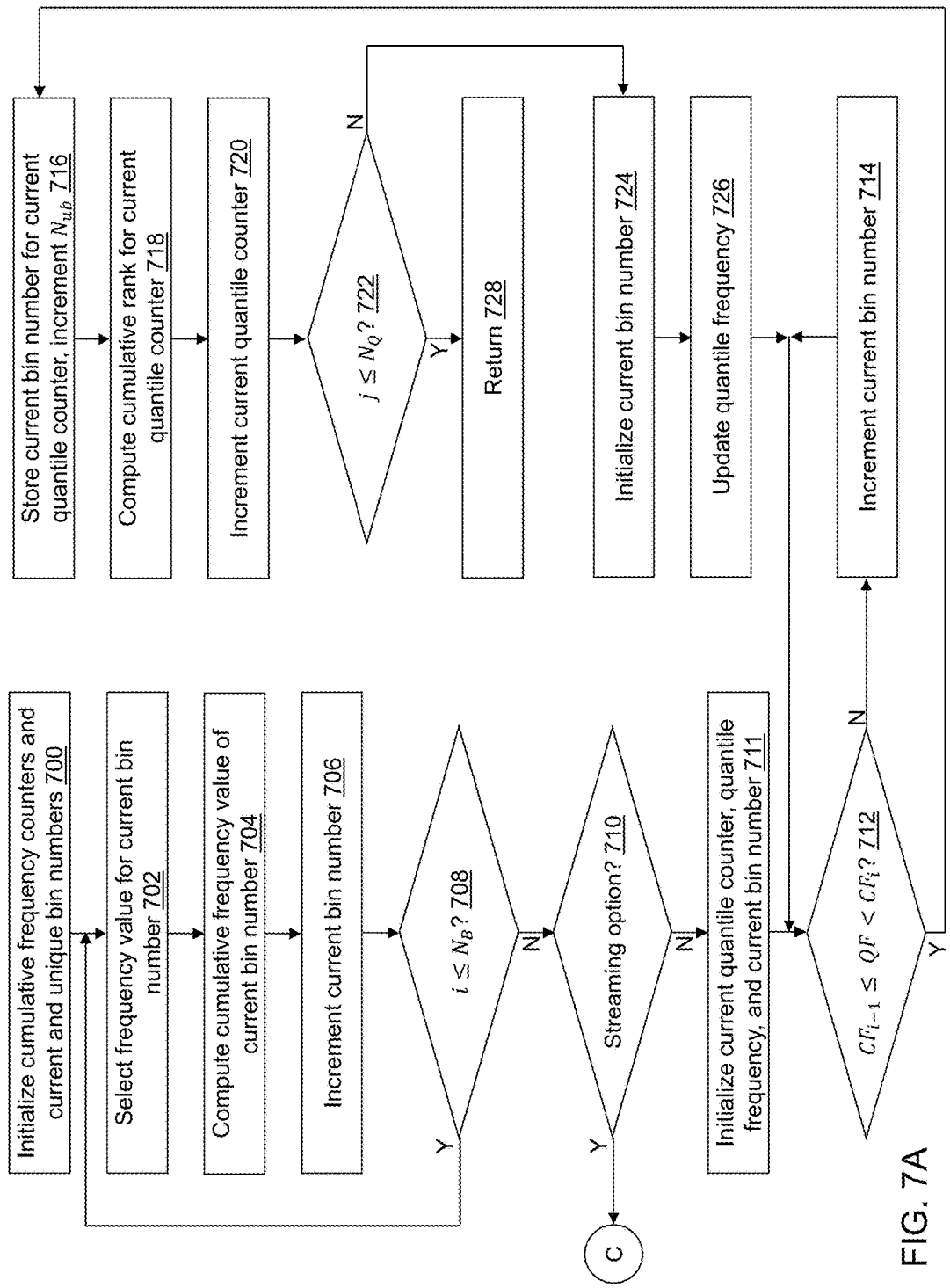
Figure 7B:
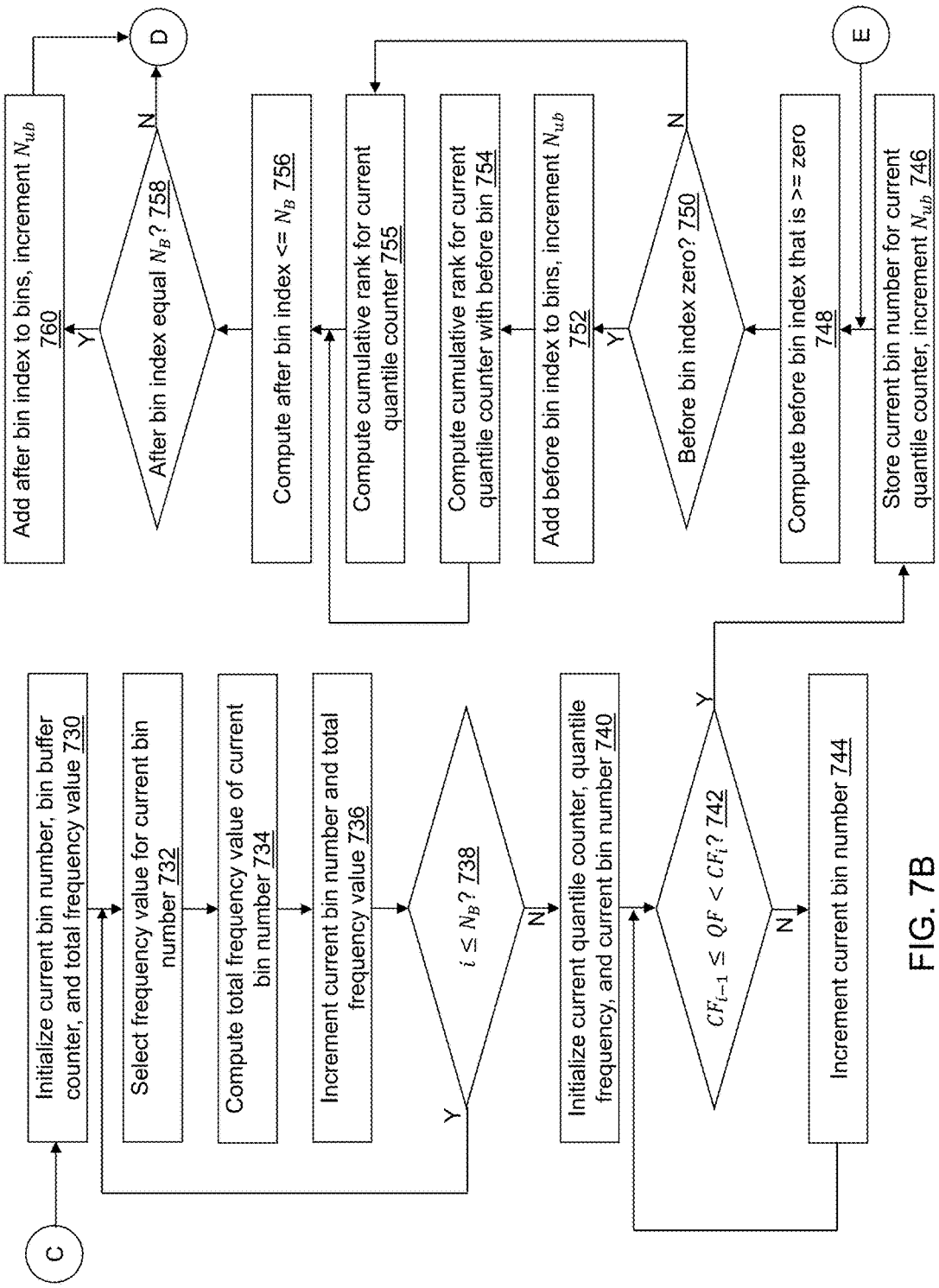
Figure 8:
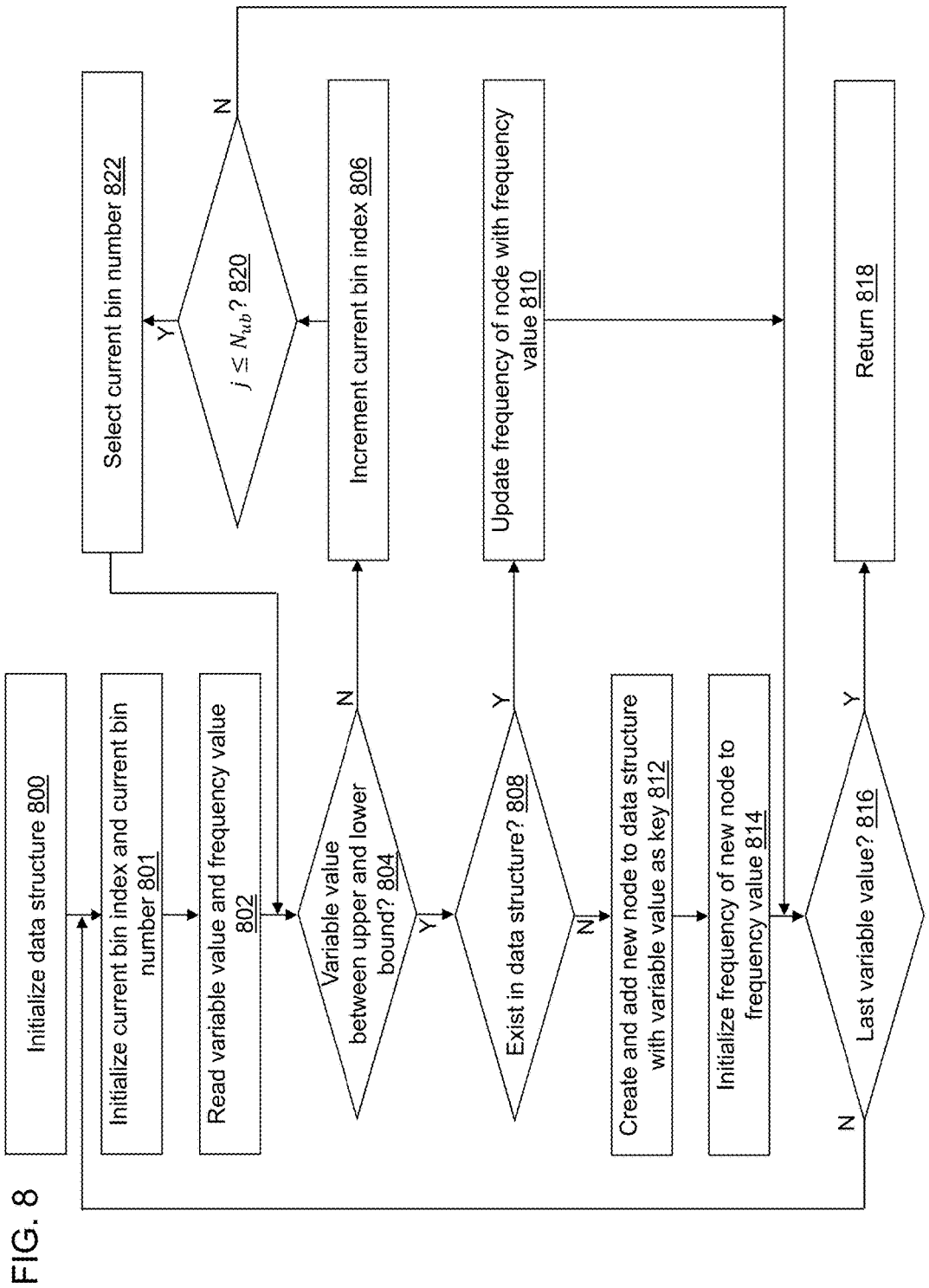

Referring to FIG. 2B, in operation 218, a maximum value $M_{xkn}$, a minimum value $M_{nkn}$, and a total number of observations $N_{okn}$ of the variable x may be computed by each thread k of the number of threads $N_T$ of each computing device n of the number of computing nodes $N_N$ of distributed computing system 130. For illustration, example operations for the maximum value $M_{xkn}$, the minimum value $M_{nkn}$, and the total number of observations $N_{okn}$ of the variable x are shown referring to FIG. 4.

In an operation 400, a maximum value $M_{xkn}$, a minimum value $M_{ikn}$, and a total number of observations $N_{okn}$ of the variable x are initialized. For example, the maximum value $M_{xkn}$ is initialized to a maximum value included in frequency data $T_{xkn}$, the minimum value $M_{ikn}$ is initialized to a minimum value included in frequency data $T_{xkn}$, and the total number of observations $N_{okn}$ is initialized based on the frequency values stored in frequency data $T_{xkn}$. Frequency data $T_{xkn}$ can then be discarded because it is incomplete.

In an operation 402, a variable value v for variable x and a frequency value for the variable value are read from input dataset 124. On a first iteration of operation 402, the line read in operation 302 that resulted in setting the counter flag to true in operation 306 may be processed instead of reading a next line from input dataset 124.

In an operation 404, the maximum value $M_{xkn}$ may be updated with the read variable value if the read variable value is greater than the maximum value $M_{xkn}$.

In an operation 406, the minimum value $M_{ikn}$ may be updated with the read variable value if the read variable value is less than the minimum value $M_{ikn}$.

In an operation 408, the total number of observations $N_{okn}$ is updated by adding the read frequency value to the total number of observations $N_{okn}$.

In an operation 410, a determination is made concerning whether the read variable value is a last variable value of input dataset 124. When the read variable value is a last variable value, processing continues in an operation 412. When the read variable value is not a last variable value, processing continues in operation 402 to read and process the next variable value.

In operation 412, processing to compute the maximum value $M_{xkn}$, the minimum value $M_{ikn}$, and the total number of observations $N_{okn}$ of the variable x is complete, and control returns to the calling operation.

Referring again to FIG. 2B, in an operation 220, the maximum value $M_{xkn}$, the minimum value $M_{ikn}$, and the total number of observations $N_{okn}$ of the variable x computed by each thread k of the number of threads $N_T$ of each computing device n of the number of computing nodes $N_N$ of distributed computing system 130 is merged to define a global maximum value $M_{xg}$, a global minimum value $M_{ig}$, and a global total number of observations $N_{og}$ of the variable x for input dataset 124.

In an operation 222, upper and lower bounds are computed for each bin of the $N_B$ bins indicated in operation 212. For illustration, example operations for computing the upper and lower bounds are shown referring to FIG. 5.

In an operation 500, a current bin number i and a bin size are initialized. For example, the current bin number is initialized to i=1, and the bin size is initialized to $S_i=(M_{xg}-M_{ig})/N_B$, where S may be an array storing $N_B$ values.

In an operation 502, a lower bound LB for the current bin number i is computed as $LB_i=M_{ig}+(i-1)*S_i$, where LB may be an array storing $N_B$ values.

In an operation 504, an upper bound UB for the current bin number i is computed as $UB_i=LB_i+S_i$, where UB may be an array storing $N_B$ values.

In an operation 506, the current bin number i is incremented by one.

In an operation 508, a determination is made concerning whether the current bin number i is greater than $N_B$ such that all of the $N_B$ bins have been processed. When $i \leq N_B$, processing continues in operation 502 to compute the bounds for the next bin. When $i > N_B$, processing continues in an operation 510.

In operation 510, processing to compute the upper and lower bounds for each bin of the $N_B$ bins is complete, and control returns to the calling operation.

Referring again to FIG. 2B, in operation 224, a bin frequency counter $F_{bkn}$ for each bin b of the $N_B$ bins may be computed by each thread k of the number of threads $N_T$ of each computing device n of the number of computing nodes $N_N$ of distributed computing system 130. For illustration, example operations for computing frequency counter $F_{bkn}$ are shown referring to FIG. 6.

In an operation 600, a current bin number i and each bin frequency counter $F_{bkn}$ of the $N_B$ bins are initialized. For example, the current bin number is initialized to i=1, and each bin frequency counter $F_{bkn}$ of the $N_B$ bins is initialized to zero, where $F_{bkn}$ may be an array storing $N_B$ values.

In an operation 602, a variable value v for variable x and a frequency value for the variable value are read from input dataset 124.

In an operation 604, a determination is made concerning whether the read variable value is between the upper and the lower bound of the current bin based on $LB_i \leq v < UB_i$. When the read variable value is between the upper and the lower bound, processing continues in an operation 608. When the read variable value is not between the upper and the lower bound, processing continues in an operation 606.

In operation 606, the current bin number i is incremented by one, and processing continues in operation 604 to determine if the read variable value is within the next bin.

In operation 608, the bin frequency counter $F_{ikn}$ associated with the current bin number i is updated by adding the read frequency value to the bin frequency counter $F_{ikn}$. For example, $F_{bkn}[i]=F_{bkn}[i]+f$, where f is the frequency value and $F_{bkn}$ is an array indexed by the current bin number i.

In an operation 610, the current bin number is reinitialized to i=1.

In an operation 612, a determination is made concerning whether the read variable value is a last variable value of input dataset 124. When the read variable value is a last variable value, processing continues in an operation 614. When the read variable value is not a last variable value, processing continues in operation 602 to read and process the next variable value.

In operation 614, processing to compute the bin frequency counter $F_{bkn}$ for each bin b of the $N_B$ bins is complete, and control returns to the calling operation.

Referring again to FIG. 2B, in an operation 226, the bin frequency counter $F_{bkn}$ for each bin b of the $N_B$ bins computed by each thread k of the number of threads $N_T$ of each computing device n of the number of computing nodes $N_N$ of distributed computing system 130 is merged to define a global frequency counter $F_{bg}$ for each bin b of the $N_B$ bins for input dataset 124. For example, the values computed by each thread k and each computing device n are added together for each bin b of the $N_B$ bins to compute global frequency counter $F_{bg}$ for each bin b of the $N_B$ bins. $F_{bg}$ may be an array storing $N_B$ values.

In an operation 228, a unique bin number $W_{ub}$ and a cumulative rank value $R_j$ can be computed for each quantile, where j is a quantile index into the quantile set Q indicated in operation 204, and ub is a unique bin number index based on a number of unique bins $N_{ub}$ to which each quantile of quantile set Q plus optionally any buffers are associated as described further below. As a result, $R_j$ stores $N_Q$ values, and $W_{ub}$ stores $N_{ub}$ values. $W_j$ and $R_j$ may each be an array storing $N_{ub}$ and $N_Q$ values, respectively, though different types of data structures may be used. For illustration, example operations for computing unique bin number $W_{ub}$ and cumulative rank value $R_j$ are shown referring to FIGS. 7A-7B.

In an operation 700, a current bin number i, the number of unique bins $N_{ub}$, and a cumulative frequency counter $CF_b$ of the $N_B$ bins are initialized. For example, the current bin number is initialized to i=1, $N_{ub}=1$, and each cumulative frequency counter $CF_b$ of the $N_B$ bins is initialized to zero, where $CF_b$ may be an array storing $N_B$ values. $CF_0$ may be initialized to zero. A zero$^{th}$ entry of global frequency counter $F_{bg}$ may be set to zero as $F_{0g}=0$.

In an operation 702, a frequency value $F_{ig}$ is selected from the computed global frequency counter $F_{bg}$ as the value associated with the current bin number i.

In an operation 704, a cumulative frequency counter $CF_i$ for the current bin number i is computed as $CF_i=CF_{i-1}+F_{ig}$.

In an operation 706, the current bin number i is incremented by one.

In an operation 708, a determination is made concerning whether the current bin number i is greater than $N_B$ such that all of the $N_B$ bins have been processed. When $i \leq N_B$, processing continues in operation 702 to compute the cumulative frequency counter for the next bin. When $i > N_B$, processing continues in an operation 710.

In operation 710, a determination is made concerning whether the streaming update option is true or false. When the streaming update option is false, processing continues in an operation 711. When the streaming update option is true, processing continues in an operation 730 shown referring to FIG. 7B.

In operation 711, the current bin number i, a current quantile counter j, a current quantile q, and a current quantile frequency QF are initialized. For example, the current bin number is reinitialized to i=1, the current quantile counter is initialized to j=1, the current quantile q is selected as a first entry from the quantile set Q as $q=Q_1$, and the current quantile frequency is initialized to $QF=q*N_{og}$, where $N_{og}$ is a total frequency count and is the global total number of observations of the variable x in input dataset 124. For illustration, if q=10% and $N_{og}=100$, QF=0.1*100=10 so that the tenth rank is the current quantile frequency QF.

In an operation 712, a determination is made concerning whether the current quantile frequency QF is between the cumulative frequency counters bounding the current bin based on $CF_{i-1} \leq QF < CF_i$. When the current quantile frequency QF is between the cumulative frequency counter of the current bin, processing continues in an operation 716. When the current quantile frequency QF is not between the cumulative frequency counter of the current bin, processing continues in an operation 714.

In operation 714, the current bin number i is incremented by one, and processing continues in operation 712 to determine if the current quantile frequency QF is within the cumulative frequency counters bounding the next bin.

In operation 716, the current bin number i is stored in bin number array $W_{ub}(N_{ub})=i$, and $N_{ub}$ is incremented by one, for example, using $N_{ub}=N_{ub}+1$ when i is not already included in $W_{ub}$ for a previous quantile value. For example, $N_{ub}$ is used as an index into $W_{ub}$ stored as an array.

In an operation 718, a cumulative rank value r for the current quantile counter j is computed using $r=(QF-CF_{i-1})+F_{(i-1)g}$, and stored in cumulative rank value array $R_j=r$ in association with the current quantile counter j. For example, j is used as an index into $R_j$ stored as an array.

In an operation 720, the current quantile counter j is incremented by one.

In an operation 722, a determination is made concerning whether the current quantile counter j is greater than $N_Q$ such that all of the $N_Q$ quantiles of the quantile set Q have been processed. When $j \leq N_Q$, processing continues in an operation 724. When $j > N_Q$, processing continues in an operation 728.

In operation 724, the current bin number is reinitialized to i=1. When the quantile set Q is sorted, the current bin number may not be reinitialized because the next bin number is at least as great as the current bin number.

In an operation 726, the current quantile q is selected as a $j^{th}$ entry from the quantile set Q as $q=Q_j$, the current quantile frequency is updated to $QF=q*N_{og}$, and processing continues in operation 712 to identify the bin within which the current quantile frequency is located.

In operation 728, processing to compute the bin number $W_{ub}$ and the cumulative rank value $R_j$ for each quantile j of the $N_Q$ quantiles of the quantile set Q is complete, and control returns to the calling operation.

In operation 730, a current bin number i, a bin buffer counter k, and total frequency value $TFV_b$ of the $N_B$ bins are initialized. For example, the current bin number is initialized to i=1, the bin buffer counter is initialized to k=1, and each total frequency value $TFV_b$ of the $N_B$ bins is initialized to zero, where $TFV_b$ may be an array storing $N_B$ values. $TFV_0$ may be initialized to zero.

In an operation 732, a frequency value $F_{ig}$ is selected from the computed global frequency counter $F_{bg}$ as the value associated with the current bin number i.

In an operation 734, a total frequency value $TFV_i$ for the current bin number i is computed as $TFV_i = TFV_{i-1} + F_{ig}$.

In an operation 736, the current bin number i is incremented by one.

In an operation 738, a determination is made concerning whether the current bin number i is greater than $N_B$ such that all of the $N_B$ bins have been processed. When $i \leq N_B$, processing continues in operation 732 to compute the total frequency value for the next bin. When $i > N_B$, processing continues in an operation 740.

In operation 740, the current bin number i, a current quantile counter j, a current quantile q, and a current quantile frequency QF are initialized. For example, the current bin number is reinitialized to i=1, the current quantile counter is initialized to j=1, the current quantile q is selected as a first entry from the quantile set Q as $q=Q_1$, and the current quantile frequency is initialized to $QF=q*N_{og}$.

In an operation 742, a determination is made concerning whether the current quantile frequency QF is between the cumulative frequency counters bounding the current bin based on $CF^{i-1} \leq QF < CF^i$. When the current quantile frequency QF is between the cumulative frequency counter of the current bin, processing continues in an operation 746. When the current quantile frequency QF is not between the cumulative frequency counter of the current bin, processing continues in an operation 744.

In operation 744, the current bin number i is incremented by one, and processing continues in operation 742 to determine if the current quantile frequency QF is within the cumulative frequency counters bounding the next bin.

In operation 746, the current bin number i is stored in bin number array $W_{ub}(N_{ub})=i$, and $N_{ub}$ is incremented by one, for example, using $N_{ub}=N_{ub}+1$ when i is not already included in $W_{ub}$ for a previous quantile value. For example, $N_{ub}$ is used as an index into $W_{ub}$ stored as an array.

In an operation 748, a before bin index $b_c$ is computed that is greater than or equal to zero such that $b_c = \max(i-1, 0)$.

In an operation 750, a determination is made concerning whether the before bin index $b_c=0$. When the before bin index $b_c=0$, processing continues in an operation 752. When the before bin index $b_c \neq 0$, processing continues in an operation 755.

In operation 752, the before bin index is stored in bin number array $W_{ub}(N_{ub})=b_c$, and $N_{ub}$ is incremented by one, for example, using $N_{ub}=N_{ub}+1$ when $b_c$ is not already included in $W_{ub}$.

In an operation 754, a cumulative rank value r for the before bin index of the current quantile counter j is computed using $r=(QF-CF_{i-1})+TFV_{i-1}+F_{b_c g}$, and stored in cumulative rank value array $R_j=r$ in association with the current quantile counter j, and processing continues in an operation 756.

In operation 755, a cumulative rank value r for the current quantile counter j is computed using $r=(QF-CF_{i-1})+TFV_{i-1}$, and stored in cumulative rank value array $R_j=r$ in association with the current quantile counter j.

In an operation 756, an after bin index $a_c$ is computed that is less than or equal to $N_B$ such that $a_c = \min(i+1, N_B)$.

In an operation 758, a determination is made concerning whether the after bin index $a_c = N_B$. When the after bin index $a_c = N_B$, processing continues in an operation 760. When the after bin index $a_c \neq N_B$, processing continues in an operation 762 shown referring to FIG. 7C.

In operation 760, the after bin index $a_c$ is stored in bin number array $W_{ub}(N_{ub})=a_c$, and $N_{ub}$ is incremented by one, for example, using $N_{ub}=N_{ub}+1$ when $a_c$ is not already included in $W_{ub}$.

Referring to FIG. 7C, in operation 762, a quantile before bin $PW_{j,k}$ that indicates the bin before the current quantile is defined in association with the current quantile counter j and the bin buffer counter k as $PW_{j,k}=i-1+k$, where, for illustration, $PW_{j,k}$ may be an array storing $N_Q$ values when $S_{BB}=1$, or a doubly dimensioned array storing $N_Q$ by $S_{BB}$ values when $S_{BB}>1$.

In an operation 764, a cumulative rank value r for the quantile before bin of the current quantile counter j and the bin buffer counter k is computed using $r=(QF-CF_{i-1})+F_{b_c g}$, and stored in left buffer rank value $LF_{j,k}=r$ in association with the current quantile counter j and the bin buffer counter k, where, for illustration, $LF_{j,k}$ may be an array storing $N_Q$ values when $S_{BB}=1$, or a doubly dimensioned array storing $N_Q$ by $S_{BB}$ values when $S_{BB}>1$.

In an operation 766, a quantile after bin $NW_{j,k}$ that indicates the bin after the current quantile is defined in association with the current quantile counter j and the bin buffer counter k as $NW_{j,k}=i+1+k$, where, for illustration, $NW_{j,k}$ may be an array storing $N_Q$ values when $S_{BB}=1$, or a doubly dimensioned array storing $N_Q$ by $S_{BB}$ values when $S_{BB}>1$.

In an operation 768, a cumulative rank value r for the quantile after bin of the current quantile counter j and the bin buffer counter k is computed using $r=(CF_k-QF)+F_{a,g}$, and stored in right buffer rank value $RF_{j,k}=r$ in association with the current quantile counter j and the bin buffer counter k, where, for illustration, $RF_{j,k}$ may be an array storing $N_Q$ values when $S_{BB}=1$, or a doubly dimensioned array storing $N_Q$ by $S_{BB}$ values when $S_{BB}>1$.

In an operation 770, a determination is made concerning whether all of the bin buffers have been processed based on the bin buffer size $S_{BB}$. When $k<S_{BB}$, processing continues in an operation 772. When $k \geq S_{BB}$, processing continues in an operation 774.

In operation 772, the bin buffer counter k is incremented by one, and processing continues in operation 748 to compute and store values for another buffer.

In operation 774, the current quantile counter j is incremented by one.

In an operation 776, a determination is made concerning whether the current quantile counter j is greater than $N_Q$ such that all of the $N_Q$ quantiles of the quantile set Q have been processed. When $j \leq N_Q$, processing continues in an operation 778. When $j > N_Q$, processing continues in an operation 780.

In an operation 778, the current quantile q is selected as a $j^{th}$ entry from the quantile set Q as $q=Q_j$, the current quantile frequency is updated to $QF=q*N_{og}$, and processing continues in operation 730 to identify the bin within which the current quantile frequency is located.

In operation 780, processing to compute the unique bin number $W_{ub}$ and the cumulative rank value $R_j$ for each quantile j of the $N_Q$ quantiles of the quantile set Q is complete, and control returns to the calling operation.

The main difference between operations 711 to 728 and 730 to 780 is that not only is the bin that contains each quantile value stored, but an adjacent number of bins defined by the bin buffer size $S_{BB}$ are stored above and below each bin that contains a quantile value to keep additional data values in the region of identified quantile values so that precise adjustments can be computed when new data values are processed, for example, in an event stream. With the additional neighbor bins, buffers that include the existing quantile value are calculated so that the quantile values can be shifted either to the left or to the right without compromising a numerical accuracy. In a streaming environment, a number of new data values may be small compared to $N_{og}$ so that a position of quantile values typically does not shift dramatically.

Referring again to FIG. 2B, in an operation 230, frequency data $T_{bkn}$ for each number of x values in the bin defined for each quantile q may be computed by each thread k of the number of threads $N_T$ of each computing device n of the number of computing nodes $N_N$ of distributed computing system 130. Frequency data $T_{bkn}$ may be computed in a variety of manners. For illustration, example operations for computing frequency data $T_{bkn}$ are shown referring to FIG. 8.

In an operation 800, a data structure $T_{bkn}$ for the frequency data is initialized. For example, for an array type data structure for frequency data, memory is allocated for the array and array values are initialized to zero; for an AVL tree type data structure for frequency data, an empty tree is initialized; etc.

In an operation 801, a current bin index j and a current bin number i are initialized. For example, a current bin index is initialized to j=1 and is used to index into the unique bin number $W_{ub}$. The current bin number i is selected as a first entry from bin number $W_{ub}$ as $i=W_{ub}(1)$.

In an operation 802, a variable value v for variable x and a frequency value for the variable value are read from input dataset 124.

In an operation 804, a determination is made concerning whether the read variable value is between the upper bound and the lower bound of the current bin number selected from unique bin number $W_{ub}$ based on $LB_i \leq v < UB_i$. When the read variable value is between the upper and the lower bounds, processing continues in an operation 808. When the read variable value is not between the upper and the lower bounds, processing continues in an operation 806.

In operation 806, the current bin index j is incremented by one, and processing continues in an operation 820.

In operation 808, a determination is made concerning whether the variable value exists in data structure $T_{bkn}$. When the variable value exists in data structure $T_{bkn}$, processing continues in an operation 810. When the variable value does not exist in data structure $T_{xkn}$, processing continues in an operation 812. For example, the read variable value is compared to existing keys of data structure $T_{bkn}$ to identify a matching key if it exists.

In operation 810, a frequency value associated with the existing variable value is updated in data structure $T_{bkn}$ by adding the read frequency value to the frequency value associated with the existing variable value, and processing continues in an operation 816.

In operation 812, a new entry is created and added to data structure $T_{bkn}$. For example, a new AVL tree node is added in ascending order to data structure $T_{bkn}$ using the read variable value as a key so that the variable values are maintained in sorted order in data structure $T_{bkn}$.

In an operation 814, a frequency associated with the variable value key in data structure $T_{bkn}$ is initialized with the read frequency value.

In operation 816, a determination is made concerning whether the read variable value is a last variable value of input dataset 124. When the read variable value is a last variable value, processing continues in an operation 818. When the read variable value is not a last variable value, processing continues in operation 801 to read and process the next variable value.

In operation 818, processing to compute the frequency data $T_{bkn}$ for each bin k included in the unique bin number $W_{ub}$ is complete, and control returns to the calling operation.

In operation 820, a determination is made concerning whether the current bin index j is greater than $N_{ub}$ such that each bin j of the unique bin number $W_{ub}$ has been processed. When $j \leq N_{ub}$, processing continues in an operation 822. When $j > N_{ub}$, processing continues in operation 816.

In an operation 822, the current bin number i is selected as the $j^{th}$ entry from the unique bin number $W_{ub}$ as $i=W_{ub}(j)$, and processing continues in operation 804 to determine if the read variable value is within the next bin of unique bin number $W_{ub}$.

Referring again to FIG. 2B, in operation 232, frequency data $T_{bkn}$ computed by each thread of the number of threads $N_T$ of each computing device of the number of computing nodes $N_N$ of distributed computing system 130 is merged to define frequency data $T_{bg}$ on quantile computation device 100 that stores global frequency data for input dataset 124. Processing continues in an operation 238.

Referring again to FIG. 2A, in operation 234, frequency data $T_{xkn}$ computed by each thread of the number of threads $N_T$ of each computing device of the number of computing nodes $N_N$ of distributed computing system 130 is merged to define frequency data $T_{xg}$ on quantile computation device 100 that stores global frequency data for input dataset 124. The global total number of observations $N_{og}$ of the variable x is also computed.

In an operation 236, a cumulative rank value $R_j$ for each quantile j of the $N_Q$ quantiles of the quantile set Q indicated in operation 204 is computed. For illustration, the quantiles and the computed cumulative rank value may be stored as arrays with values accessed using the same index. A rank indicates a numerical order of a respective value of the variable x. The cumulative rank value $R_j$ can be computed for each $j^{th}$ quantile using $R_j = Q_j/N_{og}$, where the $j^{th}$ quantile $Q_j$ is selected as a $j^{th}$ entry from the quantile set Q.

In an operation 238, a quantile value is computed for each quantile of the $N_Q$ quantiles of the quantile set Q indicated in operation 204 using the computed frequency data. The quantile value is the value of the variable x associated with the quantile. When performed after operation 234, the frequency data is $T_{xg}$ that includes values for each unique value of the variable x; whereas, when performed after operation 232, the frequency data is $T_{bg}$ that includes values for each number of x values in the bin defined for each quantile q. As a result, frequency data $T_{bg}$ is much smaller in size than frequency data $T_{xg}$ when $N_U \geq N_X$ and is much faster to process to compute the quantile value for each quantile.

Figure 9:
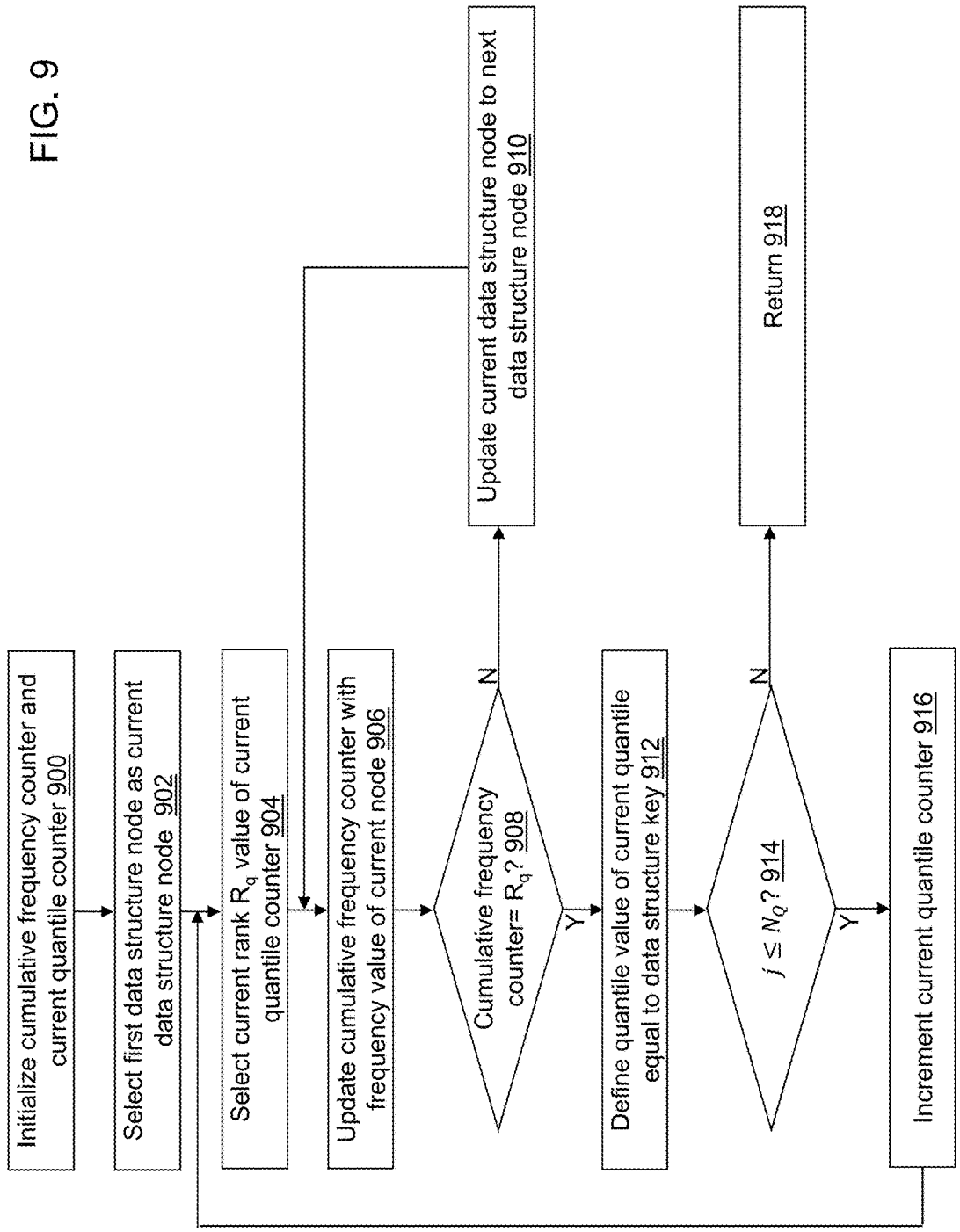

For illustration, example operations for computing each quantile value from the frequency data $T_{xg}$ or $T_{bg}$ and from the cumulative rank value $R_j$ for each quantile of the $N_Q$ quantiles of the quantile set Q are shown referring to FIG. 9.

In an operation 900, a current quantile counter j, and a cumulative frequency counter C are initialized. For example, the current quantile counter is initialized to j=1, and the cumulative frequency counter is initialized to C=0.

In an operation 902, a first data structure node is selected from either the frequency data $T_{xg}$ or $T_{bg}$ as a current data structure node. For example, for an array type data structure for frequency data, a first node is an index equal to one; for an AVL tree type data structure for frequency data, a first node pointer is retrieved from the tree; etc.

In an operation 904, a current rank value r is selected from the cumulative rank value $R_j$ using the current quantile counter j as $r = R_j$.

In an operation 906, the cumulative frequency counter C is updated by adding the frequency value stored in association with the current data structure node to the current value of the cumulative frequency counter C+=FV, where FV is the frequency value stored in association with the current data structure node.

In an operation 908, a determination is made concerning whether the cumulative frequency counter C is equal to the current rank value r based on C=r. When C=r, processing continues in an operation 912. When C≠r, processing continues in an operation 910.

In operation 910, the current data structure node is updated to a next data structure node, and processing continues in operation 906. For example, for an array type data structure for frequency data, a next node is determined by incrementing the index; for an AVL tree type data structure for frequency data, a next node pointer is retrieved from the tree; etc.

In operation 912, a quantile value $Z_j$ for the current quantile counter j is selected as the key value associated with the current data structure node. As a result, $Z_j$ stores $N_Q$ values. $Z_j$ may be an array storing $N_Q$ values though different types of data structures may be used.

In an operation 914, a determination is made concerning whether the current quantile counter j is greater than $N_Q$ such that all of the $N_Q$ quantiles of the quantile set Q have been processed. When $j \leq N_Q$, processing continues in an operation 916. When $j > N_Q$, processing continues in an operation 918.

In operation 916, the current quantile counter j is incremented by one, and processing continues in operation 904.

In operation 918, processing to compute each quantile value $Z_j$ for each quantile of the $N_Q$ quantiles of the quantile set Q is complete, and control returns to the calling operation.

Referring again to FIG. 2A, in an operation 240, the quantile value(s) computed for each quantile of the $N_Q$ quantiles of the quantile set Q indicated in operation 204 may be output to quantile values 126 stored on computer-readable medium 108 or another computer-readable medium of distributed computing system 130. The associated quantile of the $N_Q$ quantiles of the quantile set Q may also be output to quantile values 126.

When streaming update option indicates true, additional quantile associated data may be output to streaming parameter values 128 stored on computer-readable medium 108 or another computer-readable medium of distributed computing system 130. For example, the bin buffer size $S_{BB}$, the batch size $N_{SB}$, the frequency data $T_{xg}$ or $T_{bg}$, the global maximum value $M_{xg}$, the global minimum value $M_{ig}$, the global total number of observations $N_{og}$, the quantile before bin $PW_j$, the left buffer rank value $LF_j$, the quantile after bin $NW_j$, the right buffer rank value $RF_j$, and the cumulative rank value $R_j$ for each quantile j of the $N_Q$ quantiles, the global frequency counter $F_{bg}$, the bin size $S_b$, the lower bound $LB_b$, and the upper bound $UB_b$ for each bin b of the $N_B$ bins, etc. may be output to streaming parameter values 128. Streaming parameter values 128 further may include the quantile value(s) $Z_j$ and the associated quantile for each quantile of the $N_Q$ quantiles of the quantile set Q.

In addition, or in the alternative, quantile values 126 and/or streaming parameter values 128 may be presented on display 116, for example, graphically in a histogram or a table, printed on printer 120, sent to another computing device using communication interface 106, etc. In addition, or in the alternative, quantile values 126 and/or streaming parameter values 128 may be returned to a calling function that requested computation of the one or more quantiles of the quantile set Q that may be executing on quantile computation device 100 or another computing device of distributed computing system 130. Processing by quantile computation application 122 is either done or process control returns to the calling function.

For comparison, quantile computation application 122 was compared to two existing actions implemented in SAS Viya 3.2: 1) a "percentile" action that implements an iterative algorithm as described in United States Patent Publication Number 20130325825 assigned to the assignee of the present application, and 2) an "aggregate" action that implements a sorting-based algorithm.

To test the performance, input dataset 124 with 1 million, 10 million, and 20 million rows was generated and the three methods were executed using a symmetric multi-processing mode on quantile computation device 100 as a single computing device with $N_X = N_B = 10000$ and $N_N = 1$. Quantile computation device 100 included eight core processors, a 2699 megahertz processor speed, and 252 gigabytes of RAM. Input dataset 124 included variable values computed using a uniform distribution with a minimum value of zero and a maximum value of 100. Table I shows run time comparisons between each of the three methods with different dataset sizes and number of threads.

TABLE I

| Input dataset 124 | $N_T$ | Quantile computation application 122 | Percentile Action, SAS Viya 3.2 | Aggregate Action, SAS Viya 3.2 |
|---|---|---|---|---|
| 1 million rows | 1 | 0.55 | 0.79 | 3.71 |
| | 5 | 0.22 | 0.18 | 2.51 |
| | 10 | 0.13 | 0.11 | 1.98 |
| | 15 | 0.13 | 0.15 | 2.06 |
| | 20 | 0.10 | 0.12 | 2.22 |
| | 25 | 0.09 | 0.12 | 2.39 |
| | 30 | 0.08 | 0.12 | 2.43 |
| 10 million rows | 1 | 5.45 | 8.34 | 55.98 |
| | 5 | 1.89 | 1.71 | 31.18 |
| | 10 | 1.69 | 0.98 | 21.71 |
| | 15 | 1.50 | 0.66 | 33.74 |
| | 20 | 1.00 | 0.61 | 33.35 |
| | 25 | 1.01 | 0.66 | 34.41 |
| | 30 | 0.77 | 0.77 | 28.69 |
| 20 million rows | 1 | 10.93 | 15.42 | 90.90 |
| | 5 | 4.47 | 3.41 | 71.10 |
| | 10 | 3.12 | 1.80 | 52.14 |
| | 15 | 1.42 | 1.31 | 55.69 |
| | 20 | 2.40 | 1.20 | 56.61 |
| | 25 | 1.23 | 0.95 | 71.60 |
| | 30 | 1.47 | 0.95 | 73.30 |

Another input dataset 124 was also generated with variable values computed using a normal distribution with a mean value of zero and a standard deviation value of 100. Table II shows run time comparisons between each of the three methods with different dataset sizes and number of threads.

TABLE II

| Input dataset 124 | $N_T$ | Quantile computation application 122 | Percentile Action, SAS Viya 3.2 | Aggregate Action, SAS Viya 3.2 |
|---|---|---|---|---|
| 1 million rows | 1 | 0.56 | 1.01 | 3.46 |
| | 5 | 0.20 | 0.21 | 3.30 |
| | 10 | 0.17 | 0.11 | 3.17 |
| | 15 | 0.12 | 0.08 | 3.20 |
| | 20 | 0.12 | 0.07 | 3.28 |
| | 25 | 0.10 | 0.07 | 3.43 |
| | 30 | 0.08 | 0.09 | 3.52 |
| 10 million rows | 1 | 5.64 | 11.62 | 40.08 |
| | 5 | 2.01 | 2.35 | 33.09 |
| | 10 | 1.70 | 1.23 | 32.63 |
| | 15 | 1.46 | 0.86 | 35.67 |
| | 20 | 1.25 | 0.69 | 35.29 |
| | 25 | 0.93 | 0.60 | 34.98 |
| | 30 | 0.77 | 0.67 | 36.76 |
| 20 million rows | 1 | 11.27 | 20.24 | 89.29 |
| | 5 | 4.14 | 4.08 | 67.90 |
| | 10 | 3.42 | 2.05 | 67.88 |
| | 15 | 3.02 | 1.53 | 68.97 |
| | 20 | 2.55 | 1.18 | 67.85 |
| | 25 | 1.99 | 1.03 | 70.74 |
| | 30 | 1.36 | 1.00 | 75.21 |

Quantile computation application 122 achieves significantly faster computations times in comparison to the aggregate action provided by SAS Viya 3.2, which both provide an exact result without the need to specify stopping criteria such as the maximal number of iterations and convergence tolerance.

Though the percentile action provided by SAS Viya 3.2 sometimes provided faster results than quantile computation application 122, the percentile action does not guarantee an exact solution and requires specification of stopping criteria such as a maximum number of iterations and a convergence tolerance. For example, Table III shows two examples of a convergence status generated using the percentile action with different settings for the maximum number of iterations (Maxiters) and the convergence tolerance (Tolerance) used to stop execution of the iterative algorithm. The first dataset "Arrest prediction" used a neural network prediction of arrest using a Chicago arrest dataset, and the second dataset "Age group prediction" used a logistics regression prediction of age group using a dataset named CAMPNRML.

As shown in Table III, the percentile action cannot converge in many cases before hitting the stop criterion. For convergence, the user must specify appropriate values for the maximum number of iterations (Maxiters) and the convergence tolerance (Tolerance) using trial and error, which requires additional computing time and user analysis time that is not captured in Tables I and II.

Quantile computation application 122 provides an efficient and exact method to locate quantiles in at most three passes through input dataset 124 that may be distributed or classified as "big data" due to the large number of values of the variable. Quantile computation application 122 avoids non-convergence situations that may occur using the iterative algorithm (the percentile action) and does not need expensive sorting that may occur using the sorting-based algorithm (the aggregate action). Therefore, quantile computation application 122 is an improvement to existing processes performed by computing devices in solving the technical problem of computing quantiles from a dataset. Quantile computation application 122 does not require a stopping criterion such as a number of iterations or a convergence tolerance for which values may be difficult to define. Quantile computation application 122 also computes an exact quantile for any distributed or big data with comparable or significantly less computational cost compared with existing methods.

TABLE III

| Dataset | Variable | Maxiters | Tolerance | Converge (Y\|N) |
|---|---|---|---|---|
| Arrest prediction | P_arrest | 10 | 1.00E−05 | N |
| | | 20 | 1.00E−05 | N |
| | | 30 | 1.00E−05 | N |
| | | 40 | 1.00E−05 | N |
| | | 50 | 1.00E−05 | Y |
| | | 10 | 1.00E−06 | N |
| | | 20 | 1.00E−06 | N |
| | | 30 | 1.00E−06 | N |
| | | 40 | 1.00E−06 | N |
| | | 50 | 1.00E−06 | Y |
| Age group prediction | P_va_d_Age_Group_21 | 10 | 1.00E−05 | N |
| | | 20 | 1.00E−05 | N |
| | | 30 | 1.00E−05 | N |
| | | 40 | 1.00E−05 | N |
| | | 50 | 1.00E−05 | N |
| | | 60 | 1.00E−05 | N |
| | | 70 | 1.00E−05 | Y |
| | | 10 | 1.00E−06 | N |
| | | 20 | 1.00E−06 | N |
| | | 30 | 1.00E−06 | N |
| | | 40 | 1.00E−06 | N |
| | | 50 | 1.00E−06 | N |
| | | 60 | 1.00E−06 | N |
| | | 70 | 1.00E−06 | Y |

Figure 10:
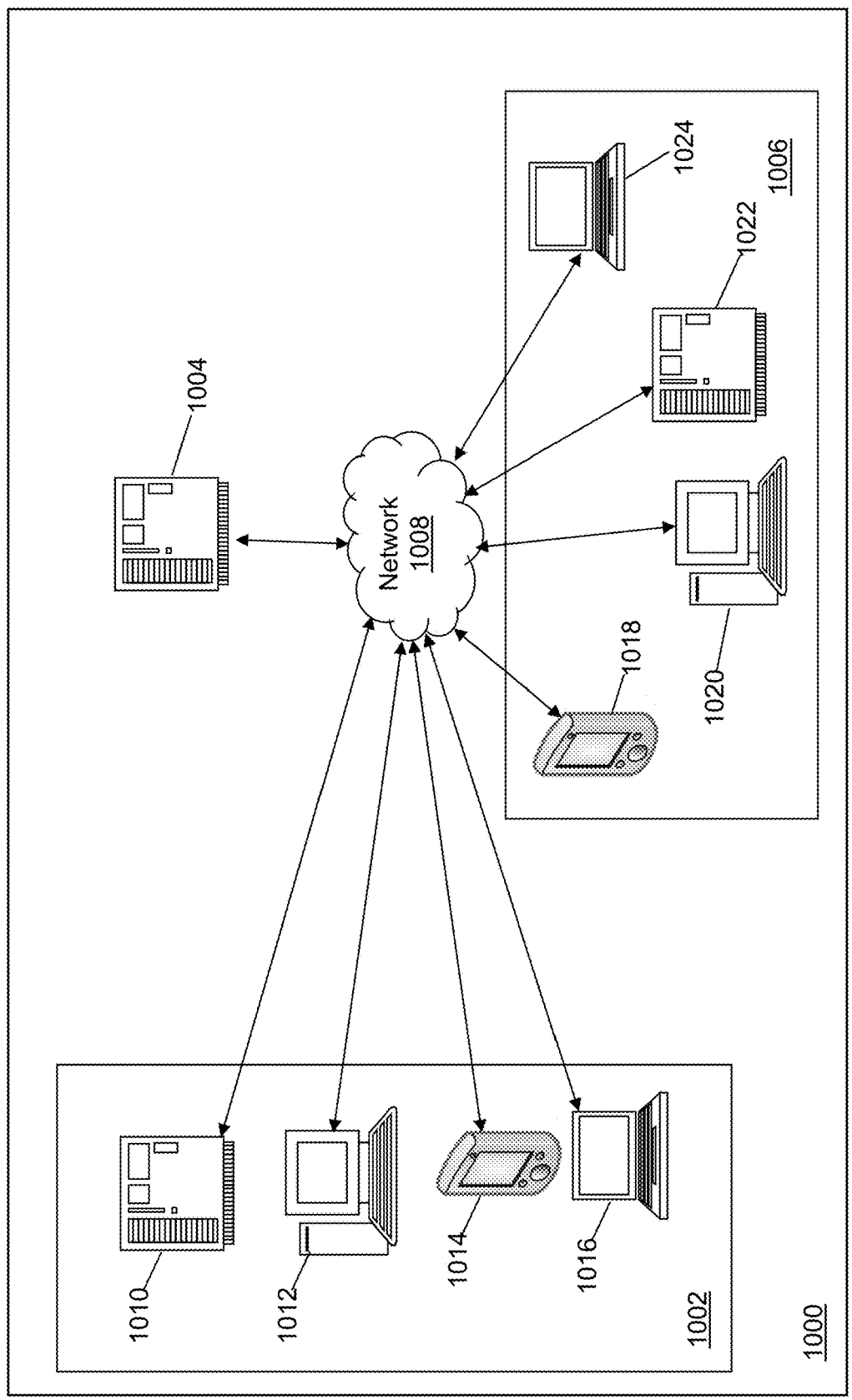
FIG. 10 depicts a block diagram of a stream processing system in accordance with an illustrative embodiment.

Referring to FIG. 10, a block diagram of a stream processing system 1000 is shown in accordance with an illustrative embodiment. In an illustrative embodiment, stream processing system 1000 may include an event publishing system 1002, an ESP device 1004, an event subscribing system 1006, and a network 1008. Each of event publishing system 1002, ESP device 1004, and event subscribing system 1006 may be composed of one or more discrete devices in communication through network 1008.

Event publishing system 1002 includes, is integrated with, and/or communicates with one or more sensors, data generation devices, data capture devices, etc. For example, a sensor may produce a sensor signal value referred to as a measurement data value representative of a measure of a physical quantity in an environment to which the sensor is associated and generate a corresponding measurement datum that typically is associated with a time that the measurement datum is generated. The environment to which the sensor is associated for monitoring may include a surveillance system, a medical imaging device, a power grid system, a telecommunications system, a fluid (e.g., oil, gas, water, etc.) pipeline, a transportation system, an industrial device, a medical device, an appliance, a vehicle, a computing device, etc. Example sensors include a camera or other image creation device, a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. As another example, a data generation device may be a computing device that generates a measurement data value in response to occurrence of an event. As still another example, a data capture device may be a computing device that receives a measurement data value generated by another device that may be in response to an event.

For example, a truck may be equipped with hundreds of sensors though as autonomous vehicle technology advances, the number of sensors is increasing rapidly. These sensors stream all types of events that are valuable to both a truck driver and a truck manufacturer. Some events require immediate reactions via Edge Analytics while others need to be processed in the Cloud where more comprehensive and detailed analysis is performed. However, the deployment of analytic tools and models in the Cloud that meets the requirements of large scale, geographically distributed, and highly dynamic sensors is challenging.

Event publishing system 1002 publishes the measurement data value to ESP device 1004 as an "event". An event is a data record that reflects something that has happened. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An "Upsert" opcode updates the event object if a key field already exists; otherwise, the event object is inserted. ESP device 1004 receives the measurement data value in an event stream, processes the measurement data value, and identifies a computing device of event subscribing system 1006 to which the processed measurement data value and/or the measurement data value and/or other field data are sent.

Network 1008 may include one or more networks of the same or different types. Network 1008 can be any type of wired and/or wireless public or private network including a cellular network, a local area network, a wide area network such as the Internet or the World Wide Web, etc. Network 1008 further may comprise sub-networks and consist of any number of communication devices.

The one or more computing devices of event publishing system 1002 may include computing devices of any form factor such as a server computer 1010, a desktop 1012, a smart phone 1014, a laptop 1016, a personal digital assistant, an integrated messaging device, a tablet computer, a point of sale system, a transaction system, a smart device, etc. Event publishing system 1002 can include any number and any combination of form factors of computing devices that may be organized into subnets. The computing devices of event publishing system 1002 send and receive signals through network 1008 to/from another of the one or more computing devices of event publishing system 1002 and/or to/from ESP device 1004. The one or more computing devices of event publishing system 1002 may communicate using various transmission media that may be wired and/or wireless as understood by those skilled in the art. The one or more computing devices of event publishing system 1002 may be geographically dispersed from each other and/or co-located. Each computing device of the one or more computing devices of event publishing system 1002 may be executing one or more event publishing application.

Figure 11:
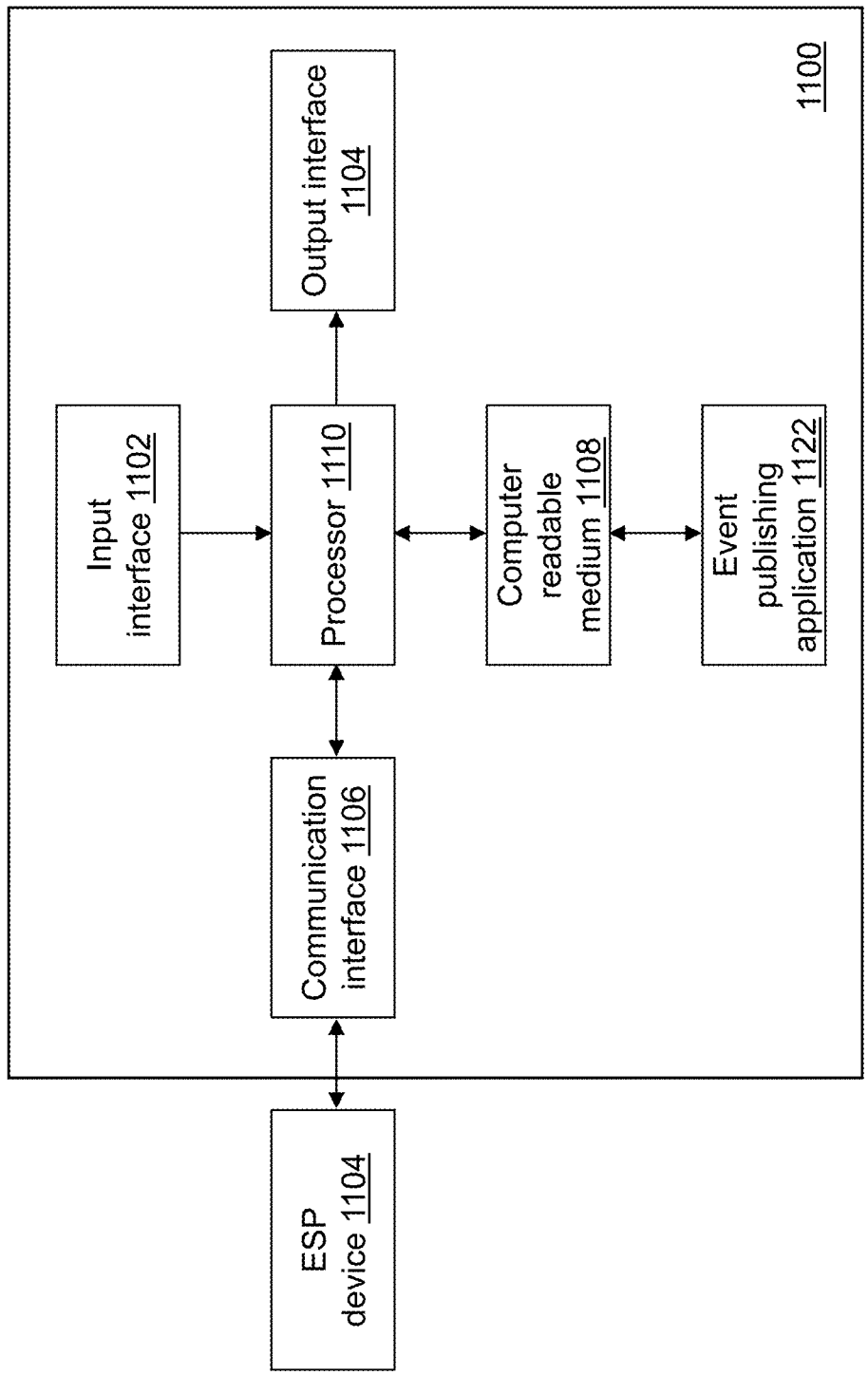
FIG. 11 depicts a block diagram of an event publishing device of an event publishing system of the stream processing system of FIG. 10 in accordance with an illustrative embodiment.

For illustration, referring to FIG. 11, a block diagram of an event publishing device 1100 is shown in accordance with an example embodiment. Event publishing device 1100 is an example computing device of event publishing system 1002. For example, each of server computer 1010, desktop 1012, smart phone 1014, and laptop 1016 may be an instance of event publishing device 1100. Event publishing device 1100 may include a second input interface 1102, a second output interface 1104, a second communication interface 1106, a second non-transitory computer-readable medium 1108, a second processor 1110, and an event publishing application 1122. Each computing device of event publishing system 1002 may be executing event publishing application 1122 of the same or a different type.

Referring again to FIG. 10, the one or more computing devices of event subscribing system 1006 may include computers of any form factor such as a smart phone 1018, a desktop 1020, a server computer 1022, a laptop 1024, a personal digital assistant, an integrated messaging device, a tablet computer, etc. Event subscribing system 1006 can include any number and any combination of form factors of computing devices. The computing devices of event subscribing system 1006 send and receive signals through network 1008 to/from ESP device 1004. The one or more computing devices of event subscribing system 1006 may be geographically dispersed from each other and/or co-located. The one or more computing devices of event subscribing system 1006 may communicate using various transmission media that may be wired and/or wireless as understood by those skilled in the art. Each computing device of the one or more computing devices of event subscribing system 1006 may be executing one or more event subscribing application.

Figure 14:
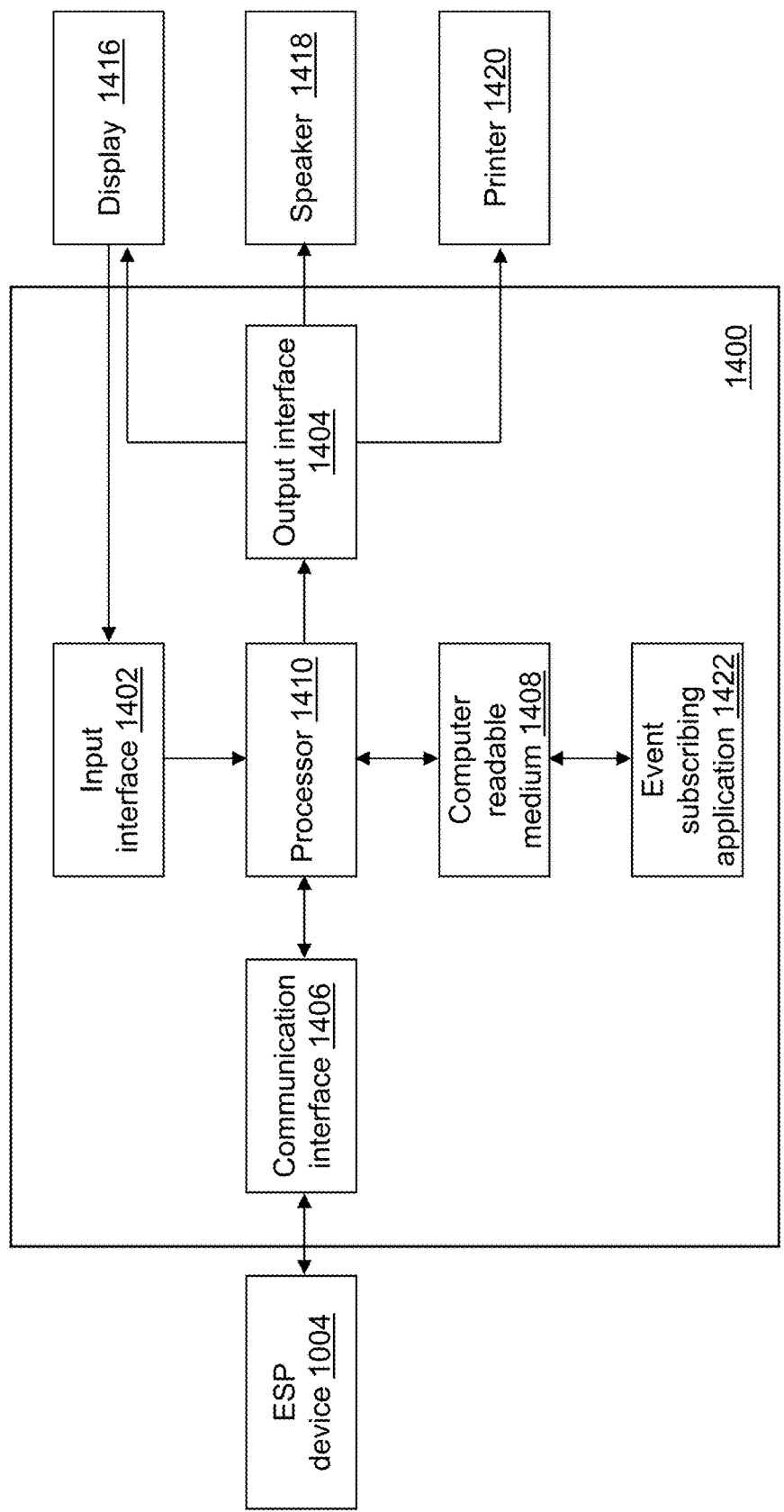
FIG. 14 depicts a block diagram of an event subscribing device of an event subscribing system of the stream processing system of FIG. 10 in accordance with an illustrative embodiment.

For illustration, referring to FIG. 14, a block diagram of an event subscribing device 1400 is shown in accordance with an example embodiment. Event subscribing device 1400 is an example computing device of event subscribing system 1006. For example, each of smart phone 1018, desktop 1020, server computer 1022, and laptop 1024 may be an instance of event subscribing device 1400. Event subscribing device 1400 may include a third input interface 1402, a third output interface 1404, a third communication interface 1406, a third computer-readable medium 1408, a third processor 1410, and an event subscribing application 1422. Each computing device of event subscribing system 1006 may be executing event subscribing application 1422 of the same or different type.

Referring again to FIG. 10, ESP device 1004 can include any form factor of computing device. For illustration, FIG. 10 represents ESP device 1004 as a server computer. In general, a server computer may include faster processors, additional processors, more disk memory, and/or more random access memory (RAM) than a client computer and support multi-threading as understood by a person of skill in the art. ESP device 1004 sends and receives signals through network 1008 to/from event publishing system 1002 and/or to/from event subscribing system 1006. ESP device 1004 may communicate using various transmission media that may be wired and/or wireless as understood by those skilled in the art. ESP device 1004 may be implemented on a plurality of computing devices of the same or different type. Stream processing system 1000 further may include a plurality of ESP devices.

Figure 16:
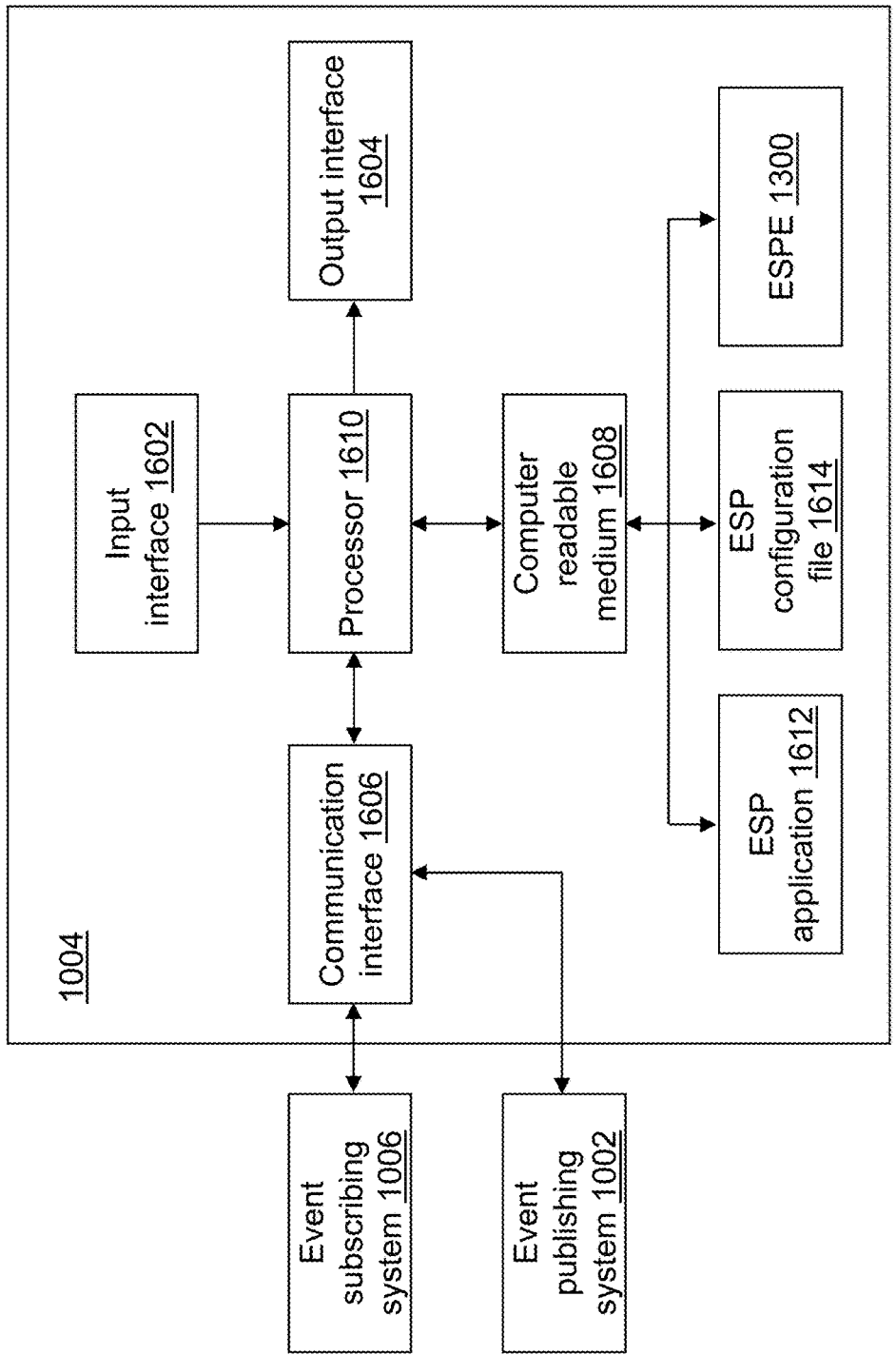
FIG. 16 depicts a block diagram of an ESP device of the stream processing system of FIG. 10 in accordance with an illustrative embodiment.

For illustration, referring to FIG. 16, a block diagram of ESP device 1004 is shown in accordance with an example embodiment. ESP device 1004 may include a fourth input interface 1602, a fourth output interface 1604, a fourth communication interface 1606, a fourth computer-readable medium 1608, a fourth processor 1610, an ESP application 1612, an ESP configuration file 1614, and an ESPE 1300. ESP device 1004 executes ESP application 1612 that reads ESP configuration file 1614 to instantiate ESPE 1300 to perform the operations of quantile computation application 122 and/or the operations of FIGS. 17, 18A, 18B, 19A, 19B, and/or 19C. ESP device 1004 and quantile computation device 100 may be the same or different computing devices.

Referring to FIG. 11, each event publishing device 1100 of event publishing system 1002 may include the same or different components and combinations of components. Fewer, different, and additional components may be incorporated into event publishing device 1100. Event publishing device 1100 may be part of the IoT. For example, event publishing device 1100 can include one or more types of the same or different sensors, and high value analytics can be applied to identify hidden relationships and drive increased efficiencies. This can apply to both big data analytics and real-time analytics. Event publishing device 1100 may be referred to as an edge device, and may include edge computing circuitry. Event publishing device 1100 may provide a variety of stored or generated data, such as network data or data specific to the network devices themselves.

In one example practical application, ESP can be employed for predictive maintenance in the trucking industry, which is responsible for moving around 10.5 billion tons of freight over 279 billion miles per year. ESP can be used to predict part failures and keep trucks on the road longer. Trucks may have hundreds of sensors that collect many different types of data, for example, from oil temperatures to engine load to turbo boost. Edge devices on the trucks can allow a trucking company to weed out data as close to the source as possible, and can initiate action in response to pertinent information in sub-second time frames. This way, the trucking company does not have to move all of their data through network 1008 or even store it in the cloud or on-premises in some situations. Also, by monitoring, filtering, and analyzing data at the source, the truck driver can be instantly alerted when, for example, oil temperature and turbo boost numbers spike at the same time. ESP can be used to recognize this pattern, which can trigger an alert that turbocharger service is needed, and the truck can be fixed in a nearby maintenance facility before any major damage occurs to the truck.

In addition to edge analytics performed at the individual truck level, there can be multi-phase analytics for ESP running on-premises or in the cloud, where the trucking company can be enabled to analyze massive amounts of data across a fleet of trucks. Cross-entity analytics can be performed by aggregating data from all of the IoT gateways that are installed on their trucks in their fleet.

ESP can further be used to enable the trucking company to take what it learned from the historical data, train new models, update existing models, and bring the new or revised models back to the edge (e.g., the truck). These operations can be performed dynamically (e.g., on the fly) and while the trucks are still on the road.

Second input interface 1102 provides the same or similar functionality as that described with reference to input interface 102 of quantile computation device 100 though referring to event publishing device 1100. Second output interface 1104 provides the same or similar functionality as that described with reference to output interface 104 of quantile computation device 100 though referring to event publishing device 1100. Second communication interface 1106 provides the same or similar functionality as that described with reference to communication interface 106 of quantile computation device 100 though referring to event publishing device 1100. Data and messages may be transferred between event publishing device 1100 and ESP device 1004 using second communication interface 1106. Second computer-readable medium 1108 provides the same or similar functionality as that described with reference to computer-readable medium 108 of quantile computation device 100 though referring to event publishing device 1100. Second processor 1110 provides the same or similar functionality as that described with reference to processor 110 of quantile computation device 100 though referring to event publishing device 1100.

Event publishing application 1122 performs operations associated with generating, capturing, and/or receiving a measurement data value and publishing the measurement data value in an event stream to one or more computing devices of event subscribing system 1006 through ESP device 1004. The operations may be implemented using hardware, firmware, software, or any combination of these methods. Referring to the example embodiment of FIG. 11, event publishing application 1122 is implemented in software (comprised of computer-readable and/or computer-executable instructions) stored in second computer-readable medium 1108 and accessible by second processor 1110 for execution of the instructions that embody the operations of event publishing application 1122. Event publishing application 1122 may be written using one or more programming languages, assembly languages, scripting languages, etc. Event publishing application 1122 may be implemented as a Web application.

Figure 12:
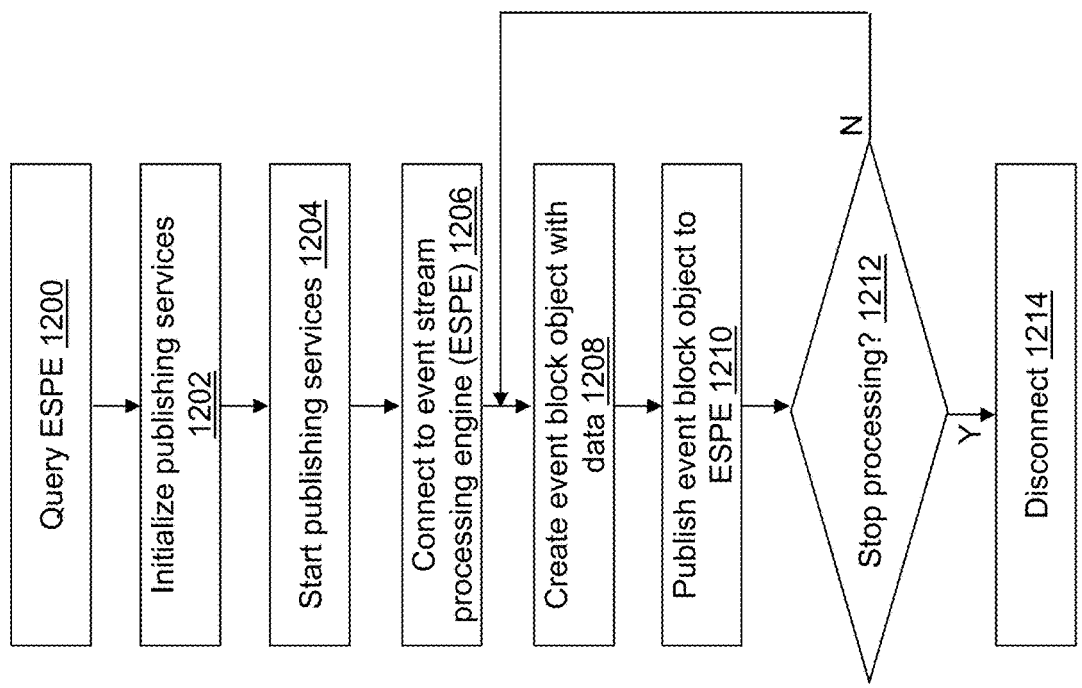
FIG. 12 depicts a flow diagram illustrating examples of operations performed by the event publishing device of FIG. 11 in accordance with an illustrative embodiment.

Referring to FIG. 12, example operations associated with event publishing application 1122 are described. Additional, fewer, or different operations may be performed depending on the embodiment. The order of presentation of the operations of FIG. 12 is not intended to be limiting. A user can interact with one or more user interface windows presented to the user in a display under control of event publishing application 1122 independently or through a browser application in an order selectable by the user. Although some of the operational flows are presented in sequence, the various operations may be performed in various repetitions, concurrently, and/or in other orders than those that are illustrated. For example, a user may execute event publishing application 1122, which causes presentation of a first user interface window, which may include a plurality of menus and selectors such as drop-down menus, buttons, text boxes, hyperlinks, etc. associated with event publishing application 1122 as understood by a person of skill in the art. As further understood by a person of skill in the art, various operations may be performed in parallel, for example, using a plurality of threads or a plurality of computing devices such as a grid or a cloud of computing devices.

Figure 13:
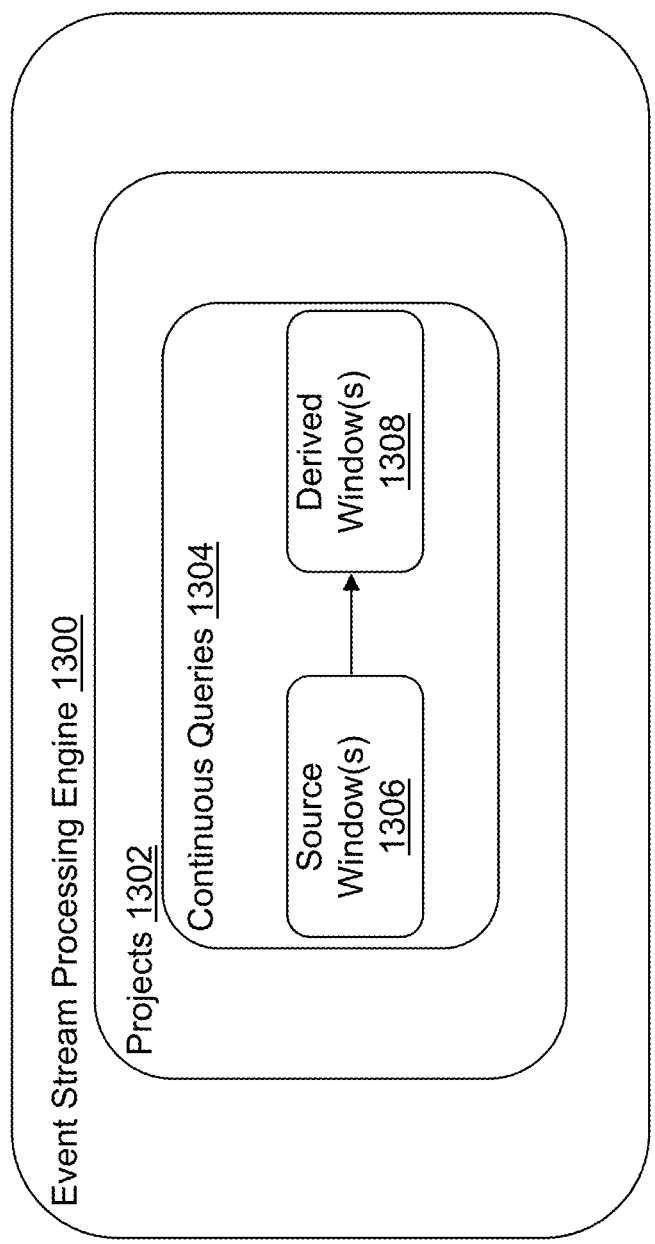
FIG. 13 depicts a block diagram of an event stream processing (ESP) engine executing on an ESP device of the stream processing system of FIG. 10 in accordance with an illustrative embodiment.

In an operation 1200, ESPE 1300 is queried, for example, to discover projects 1302, continuous queries 1304, windows 1306, 1308, window schema, and window edges currently running in ESPE 1300. For example, referring to FIG. 13, the components of ESPE 1300 are shown in accordance with an illustrative embodiment.

ESPE 1300 may include one or more projects 1302. A project may be described as a second-level container in an engine model managed by ESPE 1300 where a thread pool size for the project may be defined by a user. A value of one for the thread pool size indicates that writes are single-threaded. Each project of the one or more projects 1302 may include one or more continuous queries 1304 that contain data flows, which are data transformations of incoming event streams. The one or more continuous queries 1304 may include one or more source windows 1306 and one or more derived windows 1308.

The engine container is the top-level container in a model that manages the resources of the one or more projects 1302. In an illustrative embodiment, for example, there is a single ESPE 1300 for each instance of an ESP model executed. Each ESPE 1300 has a unique engine name. Additionally, the one or more projects 1302 may each have unique project names, and each query may have a unique continuous query name and begin with a uniquely named source window of the one or more source windows 1306. Each ESPE 1300 may or may not be persistent. Each ESPE 1300 is a unique process so the projects/queries/windows need not be uniquely named. They are distinguished by the unique input streams received on ESPE-specific transmission control protocol/internet protocol (TCP/IP) connections.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, procedural, etc. windows. The one or more source windows 1306 and the one or more derived windows 1308 represent continuously executing queries that generate updates to a query result set as new event blocks stream through ESPE 1300. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. For example, the event object may include a value for variable x and a frequency value for the variable x. The event object may be created using a variety of formats including binary, alphanumeric, XML, etc. Each event object may include one or more fields designated as a primary ID for the event so ESPE 1300 can support the opcodes for events including insert, update, upsert, and delete. As a result, events entering a source window of the one or more source windows 1306 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, partial-update, or a retention generated event from retention policy management, one or more microsecond timestamps, etc. For example, the one or more microsecond timestamps may indicate a sensor data generation time, a data receipt time by event publishing device 1100, a data transmit time by event publishing device 1100, a data receipt time by ESPE 1300, etc.

An event block object may be described as a grouping or package of one or more event objects. An event stream may be described as a flow of event block objects. A continuous query of the one or more continuous queries 1304 transforms the incoming event stream made up of streaming event block objects published into ESPE 1300 into one or more outgoing event streams using the one or more source windows 1306 and the one or more derived windows 1308. A continuous query can also be thought of as data flow modeling.

The one or more source windows 1306 are at the top of the directed graph and have no windows feeding into them. Event streams are published into the one or more source windows 1306, and from there, the event streams are directed to the next set of connected windows as defined by the directed graph. The one or more derived windows 1308 are all instantiated windows that are not source windows and that have other windows streaming events into them. The one or more derived windows 1308 perform computations or transformations on the incoming event streams. The one or more derived windows 1308 transform event streams based on the window type (that is operators such as join, filter, compute, aggregate, copy, pattern match, procedural, union, etc.) and window settings. As event streams are published into ESPE 1300, they are continuously queried, and the resulting sets of derived windows in these queries are continuously updated.

Referring again to FIG. 12, the engine name and host/port of ESPE 1300 may be provided as an input to the query and a list of strings may be returned with the names of the projects 1302, of the continuous queries 1304, of the windows 1306, 1308, of the window schema, and/or of the window edges of currently running projects of ESPE 1300. The host is associated with a host name or IP address of ESP device 1004. The port is the port number provided when a publish/subscribe (pub/sub) capability is initialized by ESPE 1300. The engine name is the name of ESPE 1300. The engine name of ESPE 1300 and the host/port of ESP device 1004 may be read from a storage location on second computer-readable medium 1108, may be provided on a command line, or otherwise input to or defined by event publishing application 1122 as understood by a person of skill in the art.

In an operation 1202, publishing services are initialized.

In an operation 1204, the initialized publishing services are started, which may create a publishing client for the instantiated event publishing application 1122. The publishing client performs the various pub/sub activities for the instantiated event publishing application 1122. For example, a string representation of a URL to ESPE 1300 is passed to a "Start" function. For example, the URL may include the host:port designation of ESPE 1300 executing on ESP device 1004, a project of the projects 1302, a continuous query of the continuous queries 1304, and a window of the source windows 1306. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 1122 is publishing to more than one source window of ESPE 1300, the initialized publishing services may be started to each source window using the associated names (project name, continuous query name, source window name).

Pub/sub is a message-oriented interaction paradigm based on indirect addressing. Each event subscribing device 1400 of event subscribing system 1006 specifies their interest in receiving information from ESPE 1300 by subscribing to specific classes of events, while information sources such as event publishing device 1100 publish events to ESPE 1300 without directly addressing the data recipients. Stream processing system 1000 includes ESPE 1300 that receives events from event publishing application 1122 executing on event publishing device 1100 of event publishing system 1002 and that publishes processed events to event subscribing application 1422 of event subscribing device 1400 of event subscribing system 1006.

In an operation 1206, a connection is made between event publishing application 1122 and ESPE 1300 executing on ESP device 1004 for each source window of the source windows 1306 to which any measurement data value is published. To make the connection, the pointer to the created publishing client may be passed to a "Connect" function. If event publishing application 1122 is publishing to more than one source window of ESPE 1300, a connection may be made to each started window using the pointer returned from the respective "Start" function call.

In an operation 1208, an event block object is created by event publishing application 1122 that includes a data value for variable x and, optionally, a frequency value for the variable x that may be one or may not be used if defined as one. The data value may have been received, captured, generated, etc., for example, through second communication interface 1106 or second input interface 1102 or by second processor 1110. The data value may be processed before inclusion in the event block object, for example, to change a unit of measure, convert to a different reference system, etc. The event block object may include a plurality of data values measured at different times and/or by different devices.

In an operation 1210, the created event block object is published to ESPE 1300, for example, using the pointer returned from the respective "Start" function call to the appropriate source window. Event publishing application 1122 passes the created event block object to the created publishing client, where the unique ID field in the event block object has been set by event publishing application 1122 possibly after being requested from the created publishing client. In an illustrative embodiment, event publishing application 1122 may wait to begin publishing until a "Ready" callback has been received from the created publishing client. The event block object is injected into the source window, continuous query, and project associated with the started publishing client.

In an operation 1212, a determination is made concerning whether or not processing is stopped. If processing is not stopped, processing continues in operation 1208 to continue creating and publishing event block objects. If processing is stopped, processing continues in an operation 1214.

In operation 1214, the connection made between event publishing application 1122 and ESPE 1300 through the created publishing client is disconnected, and each started publishing client is stopped.

Referring again to FIG. 14, fewer, different, and additional components may be incorporated into event subscribing device 1400. Each event subscribing device 1400 of event subscribing system 1006 may include the same or different components or combination of components.

Third input interface 1402 provides the same or similar functionality as that described with reference to input interface 102 of quantile computation device 100 though referring to event subscribing device 1400. Third output interface 1404 provides the same or similar functionality as that described with reference to output interface 104 of quantile computation device 100 though referring to event subscribing device 1400. Third communication interface 1406 provides the same or similar functionality as that described with reference to communication interface 106 of quantile computation device 100 though referring to event subscribing device 1400. Data and messages may be transferred between event subscribing device 1400 and ESP device 1004 using third communication interface 1406. Third computer-readable medium 1408 provides the same or similar functionality as that described with reference to computer-readable medium 108 of quantile computation device 100 though referring to event subscribing device 1400. Third processor 1410 provides the same or similar functionality as that described with reference to processor 110 of quantile computation device 100 though referring to event subscribing device 1400.

Figure 15:
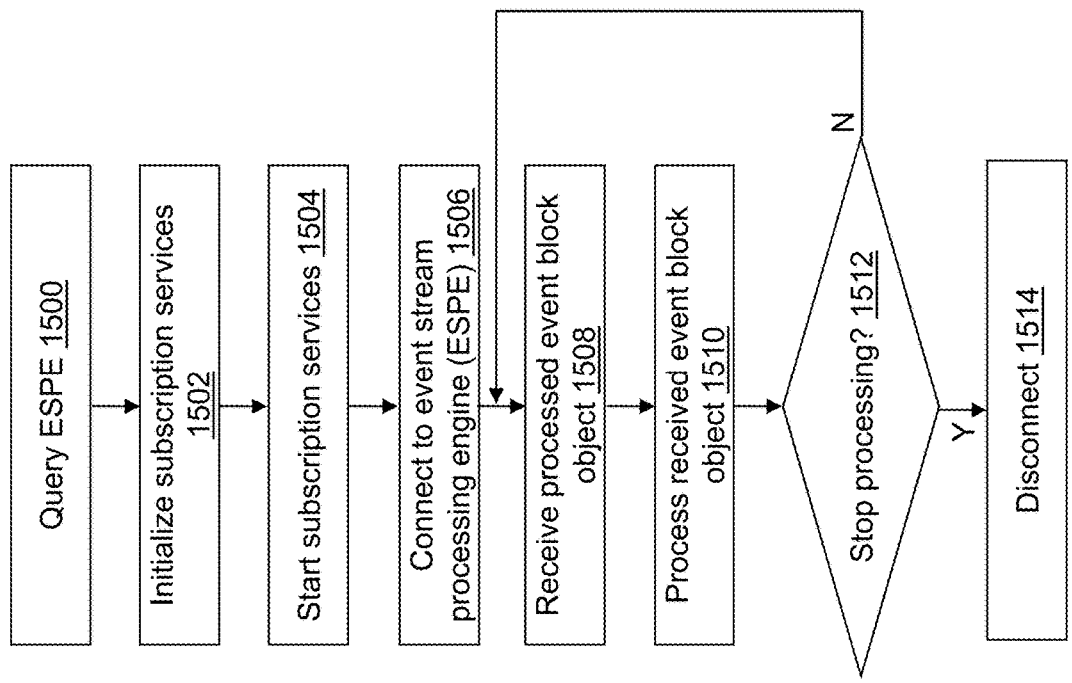
FIG. 15 depicts a flow diagram illustrating examples of operations performed by the event subscribing device of FIG. 14 in accordance with an illustrative embodiment.

Referring to FIG. 15, example operations associated with event subscribing application 1422 are described. Additional, fewer, or different operations may be performed depending on the embodiment. The order of presentation of the operations of FIG. 15 is not intended to be limiting.

Similar to operation 1200, in an operation 1500, ESPE 1300 is queried, for example, to discover names of projects 1302, of continuous queries 1304, of windows 1306, 1308, of window schema, and of window edges currently running in ESPE 1300.

In an operation 1502, subscription services are initialized.

In an operation 1504, the initialized subscription services are started, which may create a subscribing client on behalf of event subscribing application 1422 at event subscribing device 1400. The subscribing client performs the various pub/sub activities for event subscribing application 1422. For example, a URL to ESPE 1300 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1506, a connection may be made between event subscribing application 1422 executing on event subscribing device 1400 and ESPE 1300 through the created subscribing client. To make the connection, the pointer to the created subscribing client may be passed to a "Connect"

function and a mostly non-busy wait loop created to wait for receipt of event block objects.

In an operation 1508, an event block object is received by event subscribing application 1422 executing on event subscribing device 1400.

In an operation 1510, the received event block object is processed based on the operational functionality provided by event subscribing application 1422. For example, event subscribing application 1422 may extract data from the received event block object and store the extracted data in a database. In addition, or in the alternative, event subscribing application 1422 may extract data from the received event block object and send the extracted data to a system control operator display system, an automatic control system, a notification device, an analytic device, etc. In addition, or in the alternative, event subscribing application 1422 may extract data from the received event block object and send the extracted data to a post-incident analysis device to further analyze the data. Event subscribing application 1422 may perform any number of different types of actions as a result of extracting data from the received event block object. The action may involve presenting information on a second display 1416 or a second printer 1420, presenting information using a second speaker 1418, storing data in third computer-readable medium 1408, sending information to another device using third communication interface 1406, etc.

In an operation 1512, a determination is made concerning whether or not processing is stopped. If processing is not stopped, processing continues in operation 1508 to continue receiving and processing event block objects. If processing is stopped, processing continues in an operation 1514.

In operation 1514, the connection made between event subscribing application 1422 and ESPE 1300 through the subscribing client is disconnected, and the subscribing client is stopped.

Referring again to FIG. 16, fewer, different, or additional components may be incorporated into ESP device 1004. ESP device 1004 receives event block objects that may include data values for variable x and the optional frequency value for the variable x from event publishing system 1002. Fourth computer-readable medium 1608 may provide an electronic storage medium for the received event block objects.

Fourth input interface 1602 provides the same or similar functionality as that described with reference to input interface 102 of quantile computation device 100 though referring to ESP device 1004. Fourth output interface 1604 provides the same or similar functionality as that described with reference to output interface 104 of quantile computation device 100 though referring to ESP device 1004. Third communication interface 1606 provides the same or similar functionality as that described with reference to communication interface 106 of quantile computation device 100 though referring to ESP device 1004. Data and messages may be transferred between ESP device 1004 and event publishing system 1002 and/or event subscribing system 1006 using fourth communication interface 1606. Fourth computer-readable medium 1608 provides the same or similar functionality as that described with reference to computer-readable medium 108 of quantile computation device 100 though referring to ESP device 1004. Fourth processor 1610 provides the same or similar functionality as that described with reference to processor 110 of quantile computation device 100 though referring to ESP device 1004.

ESP application 1612 performs operations associated with coordinating event stream flow between event publishing system 1002 and event subscribing system 1006 through the one or more computing devices of ESP cluster system 106. The operations may be implemented using hardware, firmware, software, or any combination of these methods. Referring to the example embodiment of FIG. 16, ESP application 1612 is implemented in software (comprised of computer-readable and/or computer-executable instructions) stored in fourth computer-readable medium 1608 and accessible by fourth processor 1610 for execution of the instructions that embody the operations of ESP application 1612. ESP application 1612 may be written using one or more programming languages, assembly languages, scripting languages, etc. ESP application 1612 may be implemented as a Web application.

ESP application 1612 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable ESP application 1612 to instantiate and to embed ESPE 1300, possibly with dedicated thread pools into its own process space.

Figure 17:
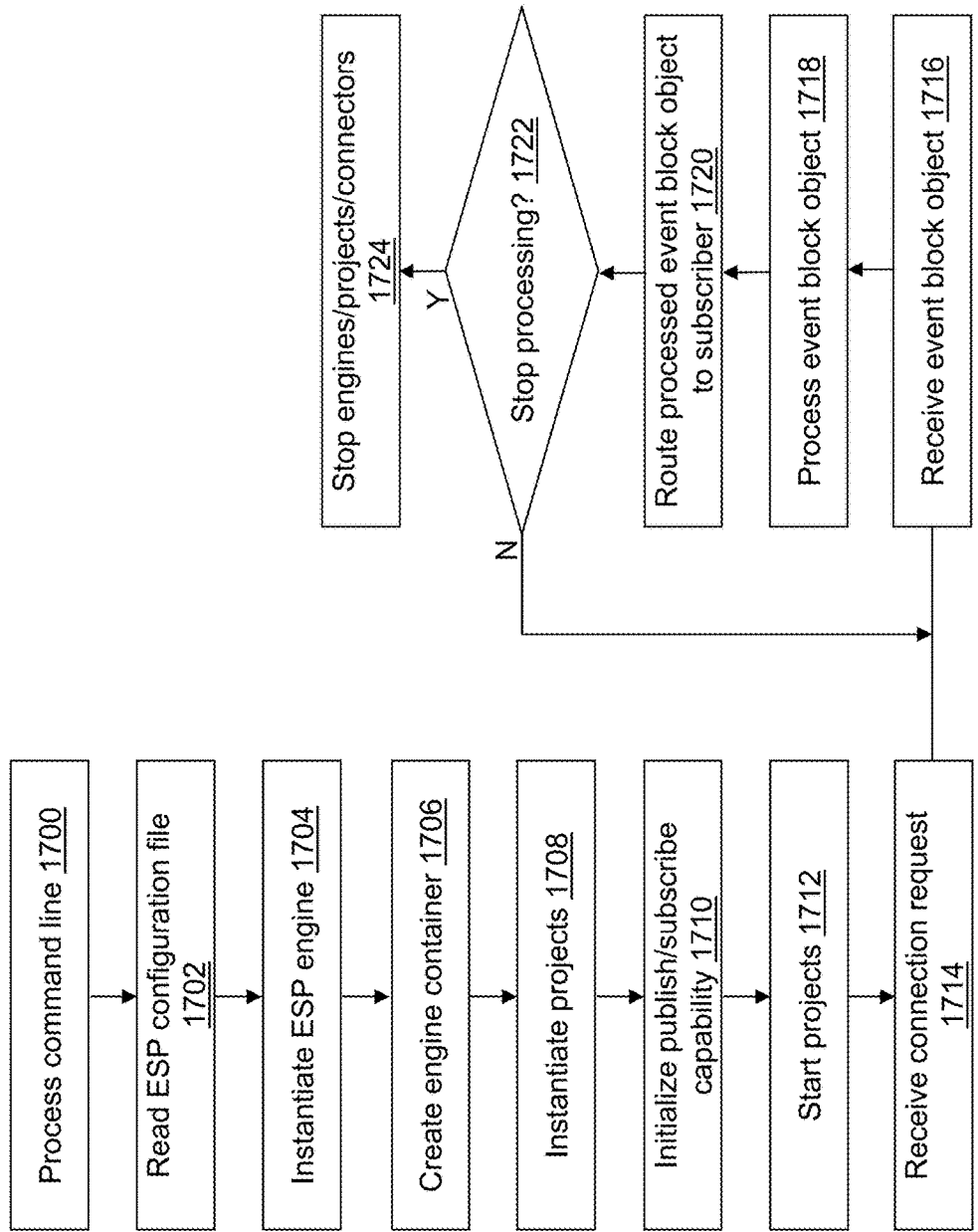
FIG. 17 depicts a flow diagram illustrating examples of operations performed by the ESP device of FIG. 16 in accordance with an illustrative embodiment.

Referring to FIG. 17, example operations associated with ESP application 1612 are described. ESP application 1612 defines how incoming event streams from event publishing system 1002 are transformed into meaningful outgoing event streams consumed by event subscribing system 1006. Additional, fewer, or different operations may be performed depending on the embodiment. The order of presentation of the operations of FIG. 17 is not intended to be limiting In an operation 1700, a command line is processed to initiate execution of ESP application 1612. A name and a location of ESP configuration file 1614 may be specified as an input parameter. In alternative embodiments, the command line parameters may be defined by default, input by a user through a user interface, etc.

In an operation 1702, ESP configuration file 1614 is read. For illustration, ESP configuration file 1614 may be an XML file that is parsed to define various parameters that are processed to dynamically control the operations performed by ESP application 1612. For example, ESP configuration file 1614 may include a name and a location of quantile values 126 and/or streaming parameter values 128.

In an operation 1704, ESPE 1300 is instantiated based on the "start=engine" definition read from ESP configuration file 1614.

In an operation 1706, the engine container is created. For illustration, ESPE 1300 may be instantiated using a function call that specifies the engine container as a manager for the model. The function call may include the engine name for ESPE 1300.

In an operation 1708, the one or more projects 1302 defined by ESP configuration file 1614 are instantiated by ESPE 1300 as a model. Instantiating the one or more projects 1302 also instantiates the one or more continuous queries 1304, the one or more source windows 1306, and the one or more derived windows 1308 read from ESP configuration file 1614. The one or more continuous queries 1304 may be instantiated with a dedicated thread pool or pools that generate updates as new event block objects stream through ESPE 1300.

For example, the instantiated projects may be configured to perform the operations of FIGS. 2A, 2B, 3 to 6, 7A, 7B, 7C, 8 and 9 on a specified initial sample size (burn-in sample) of data values for variable x and the optional frequency value for the variable x included in the event stream to define the bin buffer size $S_{BB}$, the batch size $N_{SB}$, the frequency data $T_g$, the global maximum value $M_{xg}$, the global minimum value $M_{ig}$, the global total number of observations $N_{og}$, the quantile value(s) $Z_j$, the associated quantile, the quantile before bin $PW_j$, the left buffer rank value $LF_j$, the quantile after bin $NW_j$, the right buffer rank value $RF_j$, and the cumulative rank value $R_j$ for each quantile j of the $N_Q$ quantiles, the global frequency counter $F_{bg}$, the bin size $S_b$, the lower bound $LB_b$, and the upper bound $UB_b$ for each bin b of the $N_B$ bins, etc. In another embodiment, the instantiated projects may be configured to read the bin buffer size $S_{BB}$, the batch size $N_{SB}$, the frequency data $T_g$, the global maximum value $M_{xg}$, the global minimum value $M_{ig}$, the global total number of observations $N_{og}$, the quantile value(s) $Z_1$, the associated quantile, the quantile before bin $PW_j$, the left buffer rank value $LF_j$, the quantile after bin $NW_j$, the right buffer rank value $RF_j$, and the cumulative rank value $R_j$ for each quantile j of the $N_Q$ quantiles, the global frequency counter $F_{bg}$, the bin size $S_b$, the lower bound $LB_b$, and the upper bound $UB_b$ for each bin b of the $N_B$ bins, etc. from quantile values 126 and/or streaming parameter values 128. Additionally, the instantiated projects may be configured to perform the operations of FIGS. 18A, 18B, 19A, 19B, and 19C on the data values for variable x and the optional frequency value for the variable x included in the event stream.

In an operation 1710, the pub/sub capability is initialized for ESPE 1300. In an illustrative embodiment, the pub/sub capability is initialized for each project of the one or more projects 1302 read from ESP configuration file 1614.

In an operation 1712, the one or more projects 1302 read from ESP configuration file 1614 are started. The one or more started projects may run in the background on ESP device 1004.

In an operation 1714, a connection request is received from event publishing device 1100 for a source window of ESPE 1300 to which data will be published or from event subscribing device 1400 for a derived window of ESPE 1300 from which data will be received.

In an operation 1716, an event block object is received by ESPE 1300 from event publishing device 1100. An event block object containing one or more event objects is injected into a source window of the one or more source windows 1306 read from ESP configuration file 1614.

In an operation 1718, the received event block object is processed through the one or more continuous queries 1304 read from ESP configuration file 1614. For example, quantile values 126 and/or streaming parameter values 128 may be read or computed on a burn-in sample based on the one or more continuous queries 1304. As another example, a quantile value for one or more data values included in the received event block object may be computed by the one or more continuous queries 1304. For illustration, example operations executed by the one or more continuous queries 1304 for computing the quantile value for the one or more data values included in a batch of new observation vectors of batch size $N_{SB}$ are shown referring to FIGS. 18A, 18B, and 19A to 19C.

The operations of FIGS. 18A, 18B, and 19A to 19C perform a local update based on the values stored in quantile values 126 and/or streaming parameter values 128 to achieve maximum quantile accuracy quickly to support streaming data computations. The operations of FIGS. 18A and 18B insert new data points and update the bin data. The received data values are inserted in the frequency data $T_g$. For each received data value, a test determines if the data value fits into a bin that includes an existing quantile value and its neighbor bins. If so, the left buffer rank value $LF_j$ or the right buffer rank value $RF_j$ is adjusted. If not, the bin that the received data value fits within is determined using the lower bound $LB_b$ and the upper bound $UB_b$ for each bin b of the $N_B$ bins. The global frequency counter $F_{bg}$ is also updated for that bin.

Figure 19A:
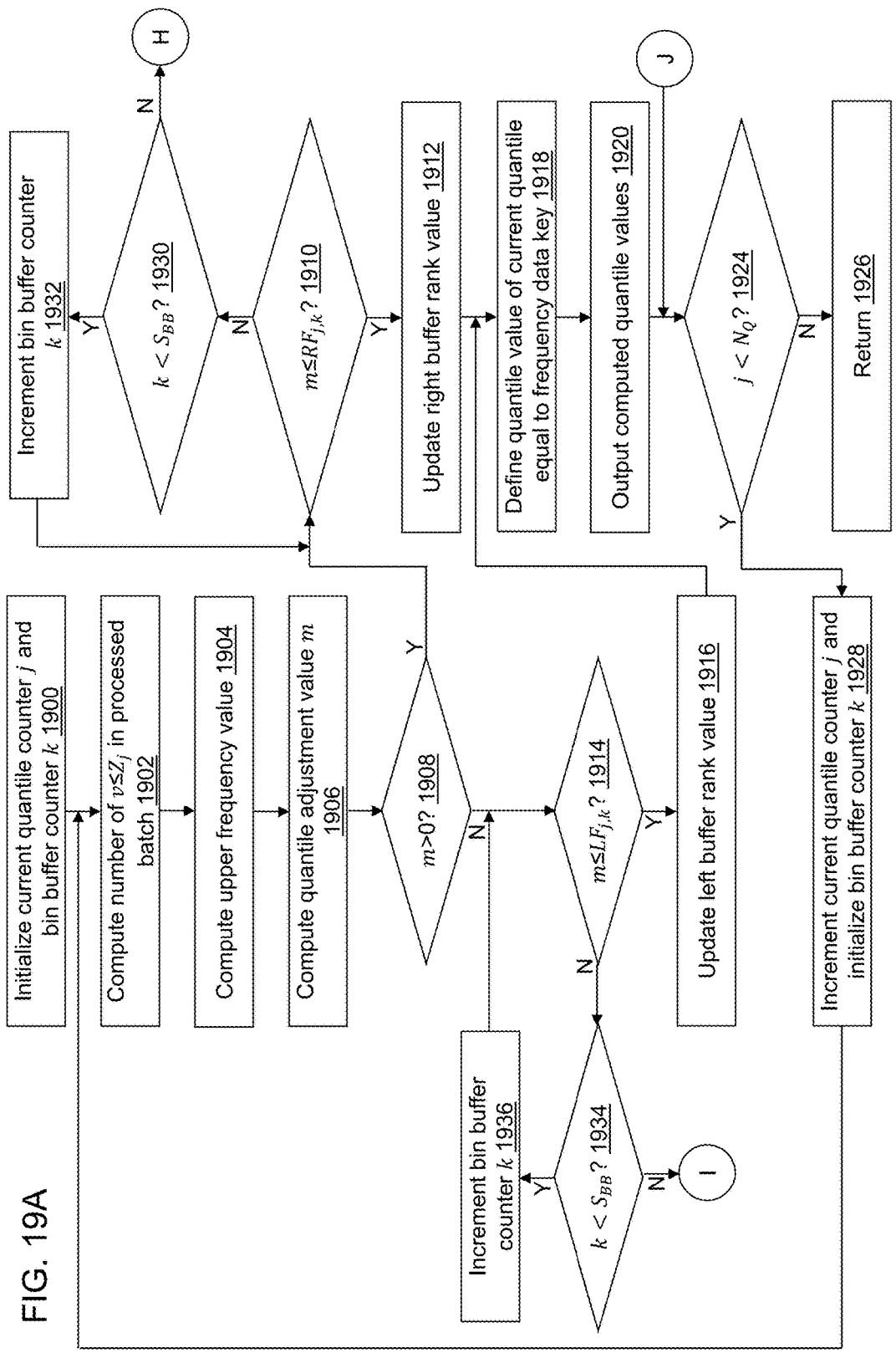
FIGS. 19A to 19C depict still further flow diagrams illustrating examples of operations performed by the ESP device of the stream processing system of FIG. 10 in accordance with an illustrative embodiment.

The operations of FIG. 19A find new quantile values using local adjustments that move the existing quantile value either left or right a number of moves, defined by a quantile adjustment value m, from a certain quantile value. If m>0, the new quantile value is moved m moves to the right of the current quantile value. If m<0, the new quantile value is moved m moves to the left of the current quantile value. Since the frequency data $T_g$ includes the data in the bin that includes the existing quantile as well as the bin buffer size $S_{BB}$ number of neighbor bins, the updated quantile is the exact quantile for the most recent data. Precise quantile updates can be computed based on the known information without executing the operations of FIGS. 2A, 2B, 3 to 6, 7A, 7B, 7C, 8 and 9 again. Therefore, the computing speed is very fast in comparison to existing methods.

Figure 19C:
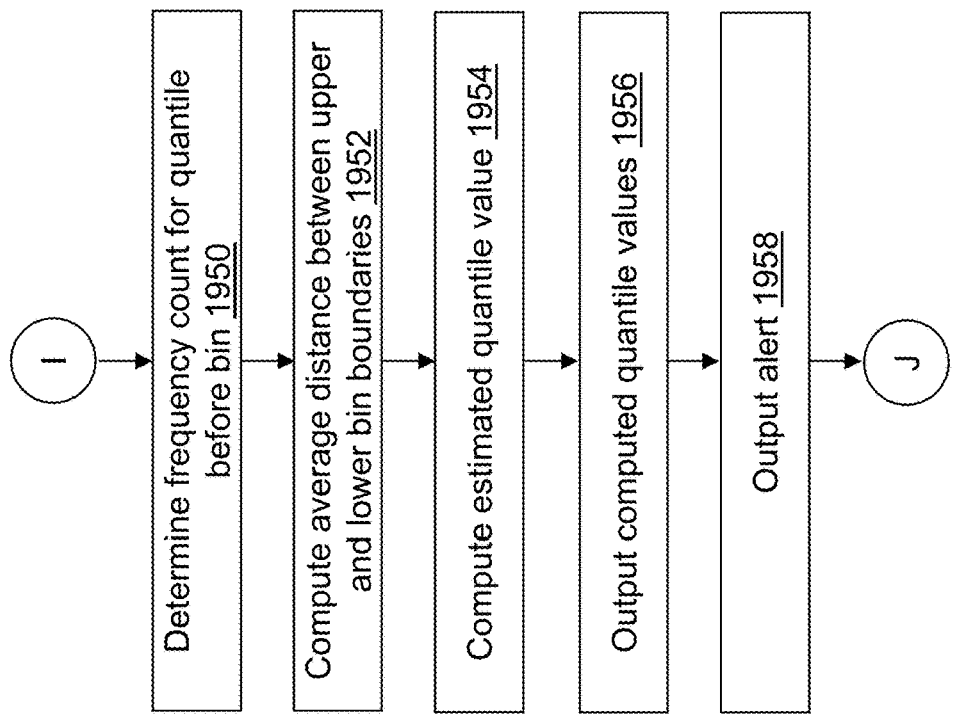
Figure 19B:
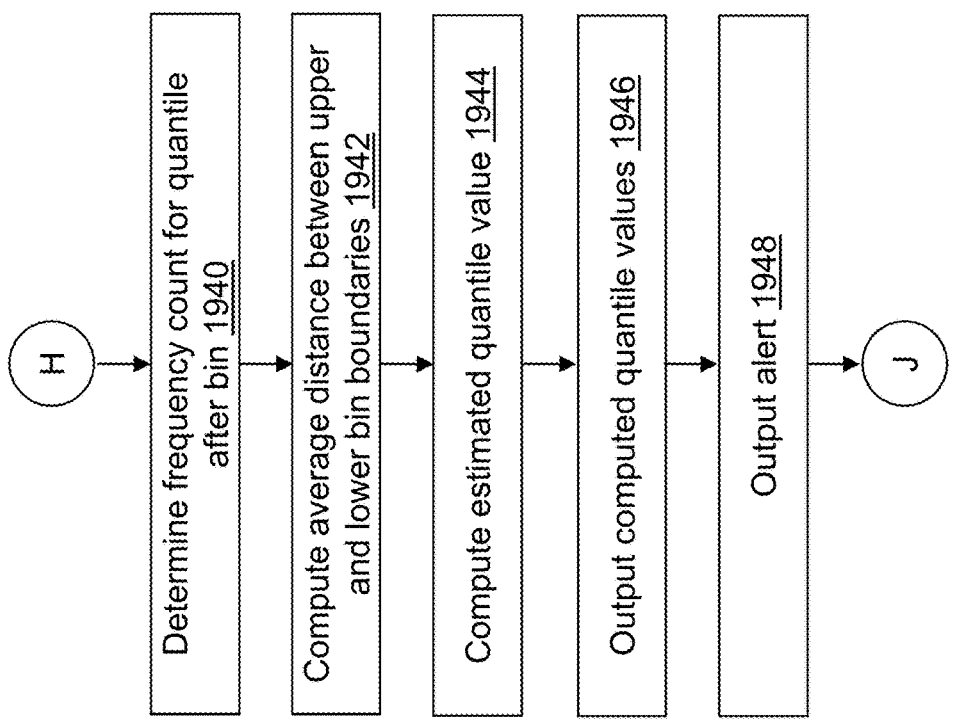

When the local movement exceeds the bin buffer size $S_{BB}$ number of neighbor bins for the quantiles, the operations of FIGS. 19B and 19C provide a best estimate of the precise quantile value. Although the frequency data $T_g$ for the bin is not stored, the lower bound $LB_b$, the upper bound $UB_b$, and the global frequency counter $F_{bg}$ for the bin are stored. The quantile value is computed based on how many extra moves are necessary in that bin based on an average distance between two numbers in that bin assuming the data in the bin is uniformly distributed, which is reasonable when the number of values in each bin is large. Nevertheless, errors may be introduced so an alert message or event may be triggered to notify a user. For example, the data value for which the local movement exceeds the bin buffer size $S_{BB}$ number of neighbor bins may be identified as an outlier. Dependent on the type of data stored in input dataset 124 and/or streamed, ESPE 1300 may identify anomalies as part of process control, for example, of a manufacturing process, for machine condition monitoring, for example, an electrocardiogram device, for image classification, for intrusion detection, for fraud detection, etc.

Figure 18A:
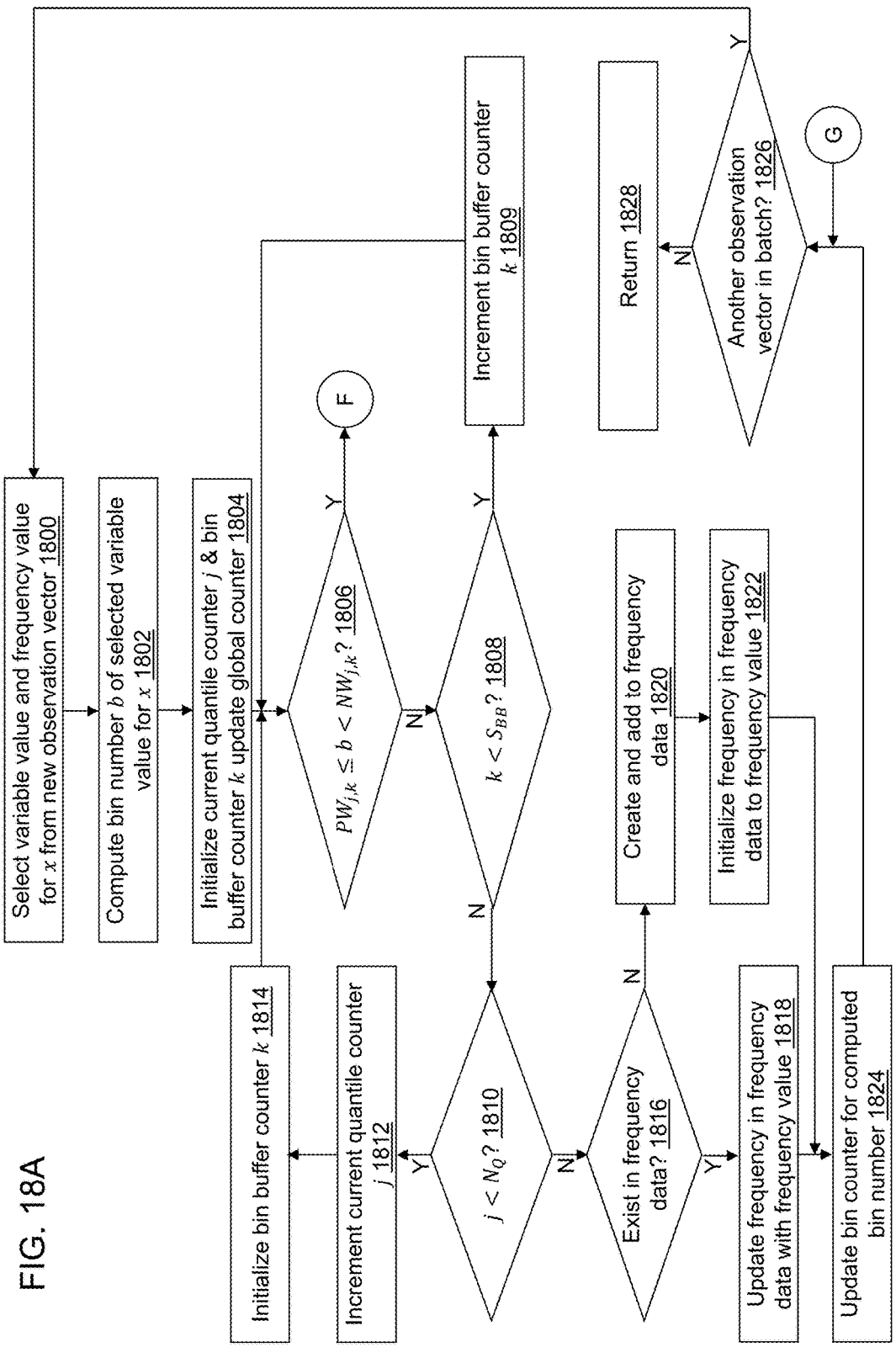
FIGS. 18A and 18B depict additional flow diagrams illustrating examples of operations performed by the ESP device of the stream processing system of FIG. 10 in accordance with an illustrative embodiment.

Referring to FIG. 18A, in an operation 1800, a variable value v for variable x and a frequency value $f_v$ for the variable value are selected from an observation vector included in an event block object of the received event stream.

In an operation 1802, a bin number b is computed for the selected variable value v for variable x, for example, using $b=(v-M_{ig})/S$, where S is the bin size, and $M_{ig}$ is the global minimum value.

In an operation 1804, a current quantile counter j and a bin buffer counter k are initialized, and the global total number of observations $N_{og}$ is updated to include the frequency value $f_v$. For example, the current quantile counter is initialized to j=1, the bin buffer counter is initialized to k=1, and the global total number of observations is updated using $N_{og}=N_{og}+f_v$.

In an operation 1806, a determination is made concerning whether $PW_{j,k} \le b < NW_{j,k}$, where $PW_{j,k}$ is the quantile before bin and $NW_{j,k}$ is the quantile after bin associated with the current quantile counter j and the bin buffer counter k. As discussed previously, $PW_{j,k}$ and $NW_{j,k}$ may be arrays storing $N_Q$ values when $S_{BB}=1$, or a doubly dimensioned array storing $N_Q$ by $S_{BB}$ values when $S_{BB}>1$. If $PW_{j,k} \le b < NW_{j,k}$, processing continues in an operation 1830 shown referring to FIG. 18B. If $PW_{jk}>b$ or $b \ge NW_{j,k}$, processing continues in an operation 1808.

In operation 1808, a determination is made concerning whether all of the bin buffers have been processed based on the bin buffer size $S_{BB}$. When $k<S_{BB}$, processing continues in an operation 1809. When $k \geq S_{BB}$, processing continues in an operation 1810.

In operation 1809, the bin buffer counter k is incremented by one, and processing continues in operation 1806 to determine if the bin number b is within the next buffer.

In operation 1810, a determination is made concerning whether $j<N_Q$ such that each quantile j of the quantiles $N_Q$ has been processed. When $j<N_Q$, processing continues in an operation 1812. When $j \geq N_Q$, processing continues in an operation 1816.

In operation 1812, the current quantile counter j is incremented by one.

In operation 1814, the bin buffer counter k is reinitialized, for example, to k=1, and processing continue in operation 1806.

In operation 1816, a determination is made concerning whether the variable value exists in the frequency data $T_g$. When the variable value exists in the frequency data $T_g$, processing continues in an operation 1818. When the variable value does not exist in the frequency data $T_g$, processing continues in an operation 1820. For example, the variable value is compared to existing keys of the frequency data $T_g$ to identify a matching key, if it exists.

In operation 1818, a frequency value associated with the existing variable value is updated in the frequency data $T_g$ by adding the frequency value $f_v$ to the frequency value associated with the existing variable value v, and processing continues in an operation 1824.

In operation 1820, a new entry is created and added to the frequency data $T_g$. For example, a new AVL tree node is added in ascending order to the frequency data $T_g$ using the variable value v as a key so that the variable values are maintained in sorted order in the frequency data $T_g$.

In an operation 1822, a frequency associated with the variable value key in the frequency data $T_g$ is initialized with the frequency value $f_v$.

In operation 1824, the global frequency counter $F_{bg}$ is updated for the computed bin number b, for example, as $F_{bg}[b]=F_{bg}[b]+f_v$.

In an operation 1826, a determination is made concerning whether there is another observation vector in the batch having the batch size $N_{SB}$. When there is another observation vector in the batch, processing continues in operation 1800 to process the next variable value. When there is not another observation vector in the batch, processing continues in an operation 1828.

In operation 1828, processing to insert the batch size $N_{SB}$ of new data values and update the bin data is complete, and control returns to the calling operation.

Figure 18B:
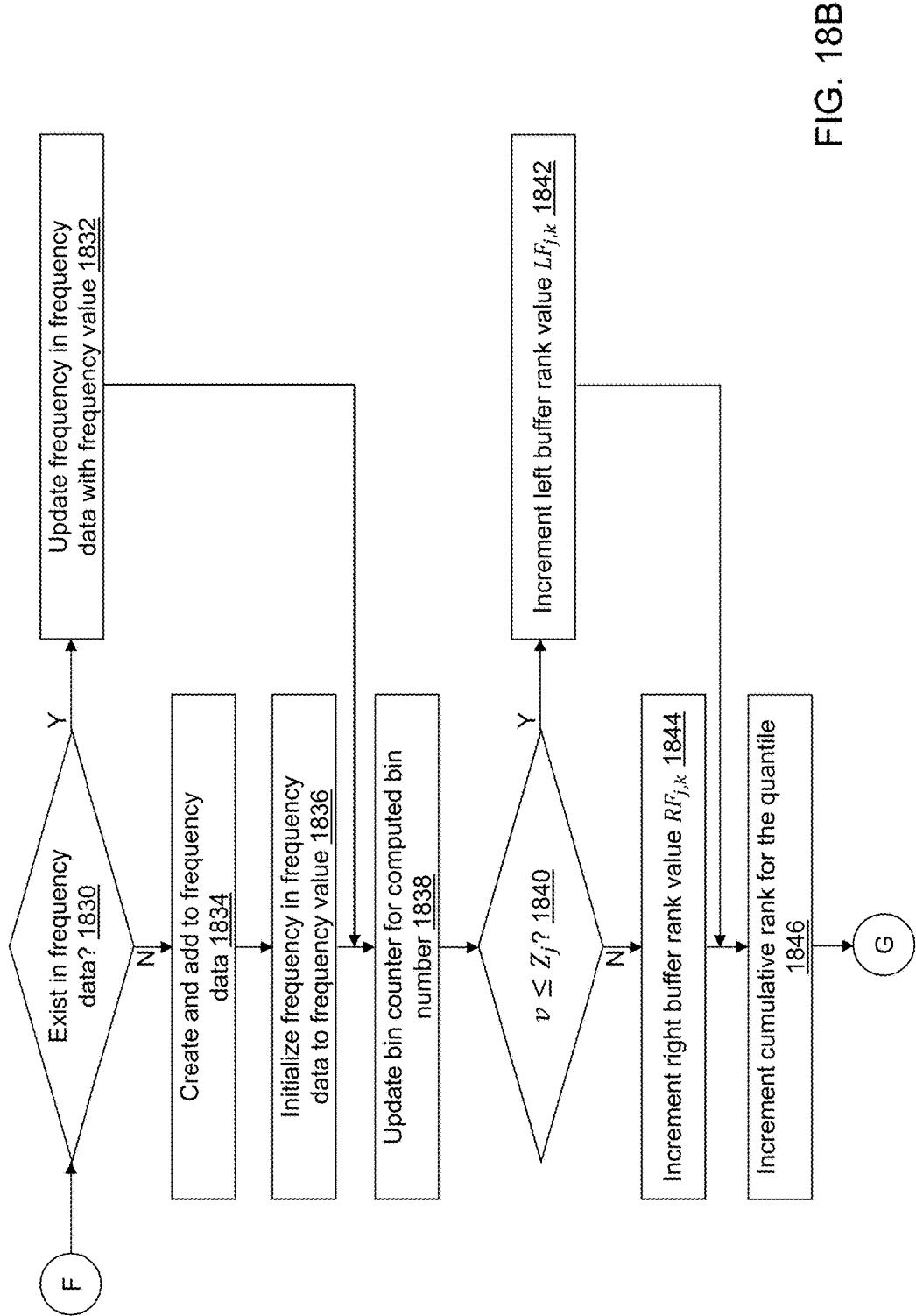

Referring to FIG. 18B, in operation 1830, a determination is made concerning whether the variable value exists in the frequency data $T_g$. When the variable value exists in the frequency data $T_g$, processing continues in an operation 1832. When the variable value does not exist in the frequency data $T_g$, processing continues in an operation 1834. For example, the variable value is compared to existing keys of the frequency data $T_g$ to identify a matching key, if it exists.

In operation 1832, a frequency value associated with the existing variable value is updated in the frequency data $T_g$ by adding the frequency value $f_v$ to the frequency value associated with the existing variable value v, and processing continues in an operation 1838.

In operation 1834, a new entry is created and added to the frequency data $T_g$. For example, a new AVL tree node is added in ascending order to the frequency data $T_g$ using the variable value v as a key so that the variable values are maintained in sorted order in the frequency data $T_g$.

In an operation 1836, a frequency associated with the variable value key in the frequency data $T_g$ is initialized with the frequency value $f_v$.

In operation 1838, the global frequency counter $F_{bg}$ is updated for the computed bin number b, for example, as $F_{bg}[b]=F_{bg}[b]+f_v$.

In an operation 1840, a determination is made concerning whether the variable value $v \leq Z_1$, where $Z_j$ is the quantile value associated with the current quantile counter j. When $v \leq Z_1$, processing continues in an operation 1842. When $v > Z_j$, processing continues in an operation 1844.

In operation 1842, the left buffer rank value $LF_{j,k}$ is incremented by one, and processing continues in operation 1846. As discussed previously, $LF_{j,k}$ may be an array storing $N_Q$ values when $S_{BB}=1$, or a doubly dimensioned array storing $N_Q$ by $S_{BB}$ values when $S_{BB}>1$.

In operation 1844, the right buffer rank value $RF_{j,k}$ is incremented by one. As discussed previously, $RF_{j,k}$ may be an array storing $N_Q$ values when $S_{BB}=1$, or a doubly dimensioned array storing $N_Q$ by $S_{BB}$ values when $S_{BB}>1$.

In operation 1846, the cumulative rank value $R_j$ associated with the current quantile j is incremented by one, and processing continues in operation 1826.

Referring to FIG. 19A, in an operation 1900, a current quantile counter j and a bin buffer counter k are initialized. For example, the current quantile counter is initialized to j=1, and the bin buffer counter is initialized to k=1.

In an operation 1902, a number of the variable values n of the batch of observation vectors processed in FIGS. 18A and 18B that have variable values $v<Z_j$ is computed, where $Z_j$ is the quantile value associated with the current quantile counter j.

In an operation 1904, an upper frequency value u is computed, for example, using $u=\text{round}(q*(N_{og}+N_{SB}))-\text{round}(q*N_{og})$, where q is the current quantile selected as a jth entry from the quantile set Q, $N_{og}$ is the global total number of observations, and $N_{SB}$ is the batch size processing by the operations of FIGS. 18A and 18B.

In an operation 1906, the quantile adjustment value m is computed, for example, using m=u−n.

In an operation 1908, a determination is made concerning whether the quantile adjustment value m>0. When m>0, processing continues in an operation 1910. When m≤0, processing continues in an operation 1914.

In operation 1910, a determination is made concerning whether the quantile adjustment value $m \leq RF_{j,k}$. When $m \leq RF_{j,k}$, processing continues in an operation 1912. When $m > RF_{j,k}$, processing continues in an operation 1930.

In operation 1912, the right buffer rank value $RF_{j,k}$ is updated using $RF_{j,k}=RF_{j,k}-m$, and processing continues in an operation 1918.

In operation 1914, a determination is made concerning whether the quantile adjustment value $m \leq LF_{j,k}$. When $m \leq LF_{j,k}$, processing continues in an operation 1916. When $m > LF_{j,k}$, processing continues in an operation 1934.

In operation 1916, the left buffer rank value $LF_{j,k}$ is updated using $LF_{j,k}=LF_{j,k}-m$, and processing continues in operation 1918.

In operation 1918, the quantile value of the current quantile counter j is defined as the key value associated with the rank valued defined by $m+R_j$ in the frequency data $T_g$.

In an operation 1920, the quantile value may be output, for example, to subscribing device 1400, to fourth computer-readable medium 1608, etc.

In operation 1924, a determination is made concerning whether $j<N_Q$ such that each quantile j of the quantiles $N_Q$ has been processed. When $j<N_Q$, processing continues in an operation 1928. When $j≥N_Q$, processing continues in an operation 1926.

In operation 1926, processing to find new quantile values using local adjustments that move the existing quantile value either left or right a number of moves defined by the quantile adjustment value m from the previous quantile value is complete, and control returns to the calling operation.

In operation 1928, the current quantile counter j is incremented by one and the bin buffer counter k is reinitialized, for example, to k=1, and processing continue in operation 1902 to process the next quantile.

In operation 1930, a determination is made concerning whether all of the bin buffers have been processed based on the bin buffer size $S_{BB}$. When $k<S_{BB}$, processing continues in an operation 1932. When $k≥S_{BB}$, processing continues in an operation 1940 shown referring to FIG. 19B.

In operation 1932, the bin buffer counter k is incremented by one, and processing continues in operation 1910.

In operation 1934, a determination is made concerning whether all of the bin buffers have been processed based on the bin buffer size $S_{BB}$. When $k<S_{BB}$, processing continues in an operation 1936. When $k≥S_{BB}$, processing continues in an operation 1950 shown referring to FIG. 19C.

In operation 1936, the bin buffer counter k is incremented by one, and processing continues in operation 1914.

Referring to FIG. 19B, in operation 1940, a frequency count is determined from $f=F_{bg}[NW_{j,k}]$.

In an operation 1942, an average distance d is computed as d=S/f that is an average distance between points in the bin assuming a uniform distribution of the data values in the bin.

In an operation 1944, an estimated quantile value is computed using $z=LB_b[NW_{j,k}]+d*(m-RF_{j,k})$.

In an operation 1946, the estimated quantile value may be output, for example, to subscribing device 1400, to fourth computer-readable medium 1608, etc.

In an operation 1948, an alert may be output, for example, to subscribing device 1400, to fourth computer-readable medium 1608, etc. indicating that an estimated quantile was computed and optionally indicating that the data value may be an outlier. For example, a number of outliers may indicate fraud. A number of outliers also may indicate that the new data values are distributed differently than the data used to compute the initial streaming parameter values.

Referring to FIG. 19C, in operation 1950, a frequency count is determined from $f=F_{bg}[PW_{j,l}]$.

In an operation 1952, an average distance d is computed as d=S/f that is an average distance between points in the bin assuming a uniform distribution of the data values in the bin.

In an operation 1954, an estimated quantile value is computed using $z=UB_b[PW_{j,k}]-d*(m-LF_{j,k})$.

In an operation 1956, the estimated quantile value may be output, for example, to subscribing device 1400, to fourth computer-readable medium 1608, etc.

In an operation 1958, an alert may be output, for example, to subscribing device 1400, to fourth computer-readable medium 1608, etc. indicating that an estimated quantile was computed and optionally indicating that the data value may be an outlier.

Referring again to FIG. 17, in an operation 1720, the processed event block object is routed to event subscribing device 1400. Subscribing devices can correlate a group of subscribed event block objects back to a group of published event block objects by comparing the unique ID of the event block object that a publisher, such as event publishing device 1100, attached to the event block object with the event block ID received by a subscribing device, such as event subscribing device 1400. The received event block objects further may be stored, for example, in a RAM or cache type memory of fourth computer-readable medium 1608. For example, event subscribing device 1400 may receive the quantile values computed from the ESP window that performs one of operations 1920, 1936, or 1946 and/or the alert computed from the ESP window that performs one of operations 1938 or 1948.

In an operation 1722, a determination is made concerning whether or not processing is stopped. If processing is not stopped, processing continues in operation 1716 to continue receiving the one or more event streams containing event block objects from event publishing system 1002. If processing is stopped, processing continues in an operation 1724.

In operation 1724, the started engines/projects/connectors are stopped, and ESPE 1300 is shutdown.

The operations of FIGS. 18A, 18B, and 19A to 19C provide efficient computation and updating of quantile values in a distributed and big data environment and on streaming data. It is generally not possible, due to the lengthy computation time, to compute quantile values on streaming data using existing methods. The operations of FIGS. 18A, 18B, and 19A to 19C can also be used in a distributed computing environment such as blockchain in which data is copied at each node and new data becomes available in a streaming manner. When new data becomes available on the blockchain, the quantiles previously were recomputed using the historical blockchain data plus the newly available data, which is very time consuming and can become intractable.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

(a) receive an event block object in an event stream from a second computing device, wherein the event stream includes a plurality of event block objects;

(b) extract a variable value of a variable from the received event block object;

(c) compute a bin number for the extracted variable value, wherein the bin number indicates a bin of a plurality of bins within which the extracted variable value is located based on an upper bin value and a lower bin value computed for each bin of the plurality of bins;

(d) determine if the computed bin number is between a before bin number computed for a quantile and an after bin number computed for the quantile;

(e) identify the quantile for the extracted variable value when the computed bin number is between the before bin number computed for the quantile and the after bin number computed for the quantile;

(f) update frequency data to include the extracted variable value as a key value, wherein a frequency value is associated with the key value, wherein the frequency value indicates a number of occurrences of the extracted variable value in previously processed data;

(g) update a cumulative rank value of the identified quantile;

(h) compute a quantile adjustment value based on a comparison between the extracted variable value and a current quantile value of the identified quantile;

(i) compute an updated quantile value associated with the identified quantile using the updated frequency data, the computed quantile adjustment value, and the updated cumulative rank value of the identified quantile; and (j) output the computed, updated quantile value.

2. The non-transitory computer-readable medium of claim 1, wherein (d) to (e) are performed for a plurality of quantiles, wherein the quantile is one of the plurality of quantiles.

3. The non-transitory computer-readable medium of claim 2, wherein (d) to (e) are performed for a plurality of bin buffers, wherein each bin buffer of the plurality of bin buffers includes the before bin number and the after bin number for a respective bin buffer.

4. The non-transitory computer-readable medium of claim 2, wherein after (c), the computer-readable instructions further cause the computing device to update a bin frequency counter for the computed bin number with a predefined frequency counter value.

5. The non-transitory computer-readable medium of claim 4, wherein updating the frequency data comprises:
determining if the extracted variable value exists in the frequency data;
when the extracted variable value exists in the frequency data, updating a frequency counter of an existing node of the frequency data associated with the extracted variable value using the predefined frequency counter value; and
when the extracted variable value does not exist in the frequency data, creating and adding a new node to the frequency data with the extracted variable value as a key and initializing the frequency counter of the new node using the predefined frequency counter value.

6. The non-transitory computer-readable medium of claim 4, wherein the predefined frequency counter value is extracted from the received event block object or is one when the predefined frequency counter value is not extracted from the received event block object.

7. The non-transitory computer-readable medium of claim 2, wherein (a) to (j) are performed for a plurality of variables, wherein the variable value is associated with one variable of the plurality of variables.

8. The non-transitory computer-readable medium of claim 2, wherein the computed, updated quantile value is sent to a third computing device by the computing device in a second event block object.

9. The non-transitory computer-readable medium of claim 2, wherein when the computed bin number is not between the before bin number computed for the quantile and the after bin number computed for the quantile, the computer-readable instructions further cause the computing device to:
determine if the extracted variable value exists in the frequency data;
when the extracted variable value exists in the frequency data, update a frequency counter of an existing node of the frequency data associated with the extracted variable value using a predefined frequency counter value; and
when the extracted variable value does not exist in the frequency data, create and add a new node to the frequency data with the extracted variable value as a key and initializing the frequency counter of the new node using a predefined frequency counter value.

10. The non-transitory computer-readable medium of claim 9, wherein the predefined frequency counter value is extracted from the received event block object or is one when the predefined frequency counter value is not extracted from the received event block object.

11. The non-transitory computer-readable medium of claim 9, wherein after (c), the computer-readable instructions further cause the computing device to update a bin frequency counter for the computed bin number with the predefined frequency counter value.

12. The non-transitory computer-readable medium of claim 2, wherein before (h), the computer-readable instructions further cause the computing device to update a buffer rank value based on whether the extracted variable value is less than or is greater than the current quantile value of the identified quantile.

13. The non-transitory computer-readable medium of claim 2, wherein the frequency value further includes a frequency counter value extracted from the received event block object in association with the variable value.

14. The non-transitory computer-readable medium of claim 2, wherein (a) to (g) are performed for a plurality of variable values extracted from the received event block object, wherein the variable value is one of the plurality of variable values.

15. The non-transitory computer-readable medium of claim 14, wherein computing the quantile adjustment value comprises:
computing a number of times the extracted variable value of each of the plurality of variable values is less than or equal to the current quantile value of the identified quantile; and
computing an upper frequency value using $\text{round}(q^*(N_{og}+N_{SB}))-\text{round}(q^*N_{og})$, where q is the identified quantile, $N_{og}$ is a total number of variable values of the variable, and $N_{SB}$ is a number of the plurality of variable values;
wherein the quantile adjustment value is the computed upper frequency value minus the computed number of times.

16. The non-transitory computer-readable medium of claim 2, wherein computing the updated quantile value comprises:
selecting a value of a key of the updated frequency data associated with a rank value computed using m+r, wherein m is the computed quantile adjustment value, and r is the updated cumulative rank value of the identified quantile.

17. The non-transitory computer-readable medium of claim 2, wherein after (h) and before (i), the computer-readable instructions further cause the computing device to:
compare the computed quantile adjustment value to a right buffer rank value associated with the identified quantile; and
when the computed quantile adjustment value is less than or equal to the right buffer rank value, update the right buffer rank value associated with the identified quantile using RF=RF−m, where m is the computed quantile adjustment value, and RF is the right buffer rank value associated with the identified quantile.

18. The non-transitory computer-readable medium of claim 17, wherein after (h) and before (i), when the computed quantile adjustment value is greater than zero and the computed quantile adjustment value is greater than the right buffer rank value, the computer-readable instructions further cause the computing device to:
estimate a quantile value for the identified quantile based on an average distance between points in a right bin number; and
output the estimated quantile value.

19. The non-transitory computer-readable medium of claim 18, wherein the quantile value is estimated using LB[NW]+d*(m−RF), where NW is the after bin number, d is the average distance, and LB is the lower bin value of the after bin number.

20. The non-transitory computer-readable medium of claim 19, wherein d is computed using d=S/f where S is a size of the after bin number based on a difference between the lower bin value and the upper bin value of the after bin number, and f is a bin frequency counter of the after bin number.

21. The non-transitory computer-readable medium of claim 18, wherein an alert message is sent to a third computing device by the computing device in a second event block object.

22. The non-transitory computer-readable medium of claim 17, wherein after (h) and before (i), when the computed quantile adjustment value is less than zero, the computer-readable instructions further cause the computing device to:
compare the computed quantile adjustment value to a left buffer rank value associated with the identified quantile; and
when the computed quantile adjustment value is less than or equal to the left buffer rank value, update the left buffer rank value associated with the identified quantile using LF=LF−m, where m is the computed quantile adjustment value, and LF is the left buffer rank value associated with the identified quantile.

23. The non-transitory computer-readable medium of claim 22, wherein after (h) and before (i), when the computed quantile adjustment value is less than zero and the computed quantile adjustment value is greater than the left buffer rank value, the computer-readable instructions further cause the computing device to:
estimate a quantile value for the identified quantile based on an average distance between points in a left bin number; and
output the estimated quantile value.

24. The non-transitory computer-readable medium of claim 23, wherein the quantile value is estimated using UB[PW]−d*(m−LF), where PW is the before bin number, d is the average distance, and UB is the upper bin value of the before bin number.

25. The non-transitory computer-readable medium of claim 24, wherein d is computed using d=S/f where S is a size of the before bin number based on a difference between the lower bin value and the upper bin value of the before bin number, and f is a bin frequency counter of the before bin number.

26. The non-transitory computer-readable medium of claim 23, wherein an alert message is sent to a third computing device by the computing device in a second event block object.

27. A computing device comprising:
a communication interface configured to receive an event block object from an event publishing device;
a processor; and
a non-transitory computer-readable medium operably coupled to the processor, the computer-readable medium having computer-readable instructions stored thereon that, when executed by the processor, cause the computing device to
(a) receive an event block object in an event stream from a second computing device, wherein the event stream includes a plurality of event block objects;
(b) extract a variable value of a variable from the received event block object;
(c) compute a bin number for the extracted variable value, wherein the bin number indicates a bin of a plurality of bins within which the extracted variable value is located based on an upper bin value and a lower bin value computed for each bin of the plurality of bins;
(d) determine if the computed bin number is between a before bin number computed for a quantile and an after bin number computed for the quantile;
(e) identify the quantile for the extracted variable value when the computed bin number is between the before bin number computed for the quantile and the after bin number computed for the quantile;
(f) update frequency data to include the extracted variable value as a key value, wherein a frequency value is associated with the key value, wherein the frequency value indicates a number of occurrences of the extracted variable value in previously processed data;
(g) update a cumulative rank value of the identified quantile;
(h) compute a quantile adjustment value based on a comparison between the extracted variable value and a current quantile value of the identified quantile;
(i) compute an updated quantile value associated with the identified quantile using the updated frequency data, the computed quantile adjustment value, and the updated cumulative rank value of the identified quantile; and
(j) output the computed, updated quantile value.

28. A method of computing a quantile value, the method comprising:
(a) receiving an event block object in an event stream from a second computing device, wherein the event stream includes a plurality of event block objects;
(b) extracting, by a computing device, a variable value of a variable from the received event block object;
(c) computing, by the computing device, a bin number for the extracted variable value, wherein the bin number indicates a bin of a plurality of bins within which the extracted variable value is located based on an upper bin value and a lower bin value computed for each bin of the plurality of bins;

(d) determining, by the computing device, if the computed bin number is between a before bin number computed for a quantile and an after bin number computed for the quantile;

(e) identifying, by the computing device, the quantile for the extracted variable value when the computed bin number is between the before bin number computed for the quantile and the after bin number computed for the quantile;

(f) updating, by the computing device, frequency data to include the extracted variable value as a key value, wherein a frequency value is associated with the key value, wherein the frequency value indicates a number of occurrences of the extracted variable value in previously processed data;

(g) updating, by the computing device, a cumulative rank value of the identified quantile;

(h) computing, by the computing device, a quantile adjustment value based on a comparison between the extracted variable value and a current quantile value of the identified quantile;

(i) computing, by the computing device, an updated quantile value associated with the identified quantile using the updated frequency data, the computed quantile adjustment value, and the updated cumulative rank value of the identified quantile; and (j) outputting, by the computing device, the computed, updated quantile value.

29. The method of claim 28, wherein (a) to (g) are performed for a plurality of variable values extracted from the received event block object, wherein the variable value is one of the plurality of variable values.

30. The method of claim 29, wherein computing the quantile adjustment value comprises:

computing a number of times the extracted variable value of each of the plurality of variable values is less than or equal to the current quantile value of the identified quantile; and computing an upper frequency value using $\text{round}(q^*(N_{og}+N_{SB}))-\text{round}(q^*N_{og})$, where q is the identified quantile, $N_{og}$ is a total number of variable values of the variable, and $N_{SB}$ is a number of the plurality of variable values;

wherein the quantile adjustment value is the computed upper frequency value minus the computed number of times.

* * * * *

UNITED STATES PATENT AND TRADEMARK OFFICE
CERTIFICATE OF CORRECTION

PATENT NO. : 10,489,485 B2
APPLICATION NO. : 16/398690
DATED : November 26, 2019
INVENTOR(S) : Xinmin Wu et al.

Page 1 of 1

It is certified that error appears in the above-identified patent and that said Letters Patent is hereby corrected as shown below:

In the Specification

Column 33, Lines 13-14:
Delete the phrase "the quantile value(s) $Z_1$," and replace with --the quantile value(s) $Z_j$,--.

Column 36, Line 13:
Delete the phrase "whether the variable value $v \leq Z_1$," and replace with --whether the variable value $v \leq Z_j$,--.

Column 36, Lines 14-15:
Delete the phrase "When $v \leq Z_1$," and replace with --When $v \leq Z_j$,--.

Column 37, Line 51:
Delete the phrase "determined from $f = F_{bg}[PW_{j,l}]$." and replace with --determined from $f = F_{bg}[PW_{j,k}]$.--.

Signed and Sealed this
Twenty-eighth Day of January, 2020

Andrei Iancu
*Director of the United States Patent and Trademark Office*